United States Patent
Sasaki et al.

(10) Patent No.: US 9,627,150 B2
(45) Date of Patent: Apr. 18, 2017

(54) ELECTRODE MATERIAL FOR BATTERIES, ELECTRODE MATERIAL PASTE FOR BATTERIES, METHOD FOR MANUFACTURING THE ELECTRODE MATERIAL FOR BATTERIES, DYE-SENSITIZED SOLAR CELL, AND STORAGE BATTERY

(71) Applicants: Kabushiki Kaisha Toshiba, Tokyo (JP); Toshiba Materials Co., Ltd., Yokohama-Shi (JP)

(72) Inventors: Akito Sasaki, Yokohama (JP); Miho Nakamura, Ayase (JP); Tomomichi Naka, Chigasaki (JP); Yoko Tokuno, Ota (JP)

(73) Assignees: Kabushiki Kaisha Toshiba, Minato-Ku (JP); Toshiba Materials Co., Ltd., Yokohama-Shi (JP)

( * ) Notice: Subject to any disclaimer, the term of this patent is extended or adjusted under 35 U.S.C. 154(b) by 209 days.

(21) Appl. No.: 14/386,568

(22) PCT Filed: Mar. 8, 2013

(86) PCT No.: PCT/JP2013/056485
§ 371 (c)(1),
(2) Date: Sep. 19, 2014

(87) PCT Pub. No.: WO2013/146194
PCT Pub. Date: Oct. 3, 2013

(65) Prior Publication Data
US 2015/0034149 A1    Feb. 5, 2015

(30) Foreign Application Priority Data
Mar. 26, 2012 (JP) .................. 2012-069796

(51) Int. Cl.
*H01B 1/08* (2006.01)
*C01G 1/02* (2006.01)
(Continued)

(52) U.S. Cl.
CPC ............. *H01G 9/2027* (2013.01); *H01B 1/08* (2013.01); *H01M 4/00* (2013.01); *H01M 4/48* (2013.01);
(Continued)

(58) Field of Classification Search
CPC ... H01B 1/00; H01B 1/08; C01G 1/02; C01G 41/02; H01M 4/48
See application file for complete search history.

(56) References Cited

U.S. PATENT DOCUMENTS 4,118,546 A    10/1978    Witzke et al.
6,706,442 B1    3/2004    Sakamoto et al.
(Continued)

FOREIGN PATENT DOCUMENTS

CN    1322381 A    11/2001
CN    102230172 A    11/2011
(Continued)

OTHER PUBLICATIONS

Chavez et al "HFCVD and CSVT techniques working together to produce nanostructeured tungsten oxide", Materials Letters 62 (2008) 4191-4194.*
(Continued)

*Primary Examiner* — Mark Kopec

(57) ABSTRACT

The present invention provides an electrode material for batteries made from tungsten oxide powder, wherein the tungsten oxide powder has a first peak present within a wavenumber range of 268 to 274 $cm^{-1}$, a second peak present within a wavenumber range of 630 to 720 $cm^{-1}$, and a third peak present within a wavenumber range of 800 to (Continued)

Comparison of Raman Spectrum
(High Frequency Region Measurement)

810 cm$^{-1}$, when a Raman spectroscopic analysis method is performed on the electrode material.

15 Claims, 4 Drawing Sheets

(51) Int. Cl.
    *H01M 4/48*    (2010.01)
    *H01G 9/20*    (2006.01)
    *H01M 4/00*    (2006.01)
    *H01M 4/62*    (2006.01)
    *H01M 14/00*   (2006.01)
    *C01G 41/02*   (2006.01)

(52) U.S. Cl.
    CPC ......... *H01M 4/622* (2013.01); *H01M 14/005* (2013.01); *C01G 41/02* (2013.01); *C01P 2002/82* (2013.01); *C01P 2006/12* (2013.01); *C01P 2006/40* (2013.01); *H01G 9/2059* (2013.01); *Y02E 10/542* (2013.01); *Y10T 428/2982* (2015.01)

(56) References Cited

U.S. PATENT DOCUMENTS

| | | | |
|---|---|---|---|
| 7,615,097 B2* | 11/2009 | McKechnie | B01J 2/006 |
| | | | 75/346 |
| 7,932,465 B2 | 4/2011 | Wang et al. | |
| 2005/0025700 A1* | 2/2005 | Bulian | B82Y 30/00 |
| | | | 423/606 |
| 2012/0082782 A1 | 4/2012 | Wu et al. | |
| 2012/0107683 A1* | 5/2012 | Kim, II | H01M 4/0419 |
| | | | 429/211 |
| 2013/0252084 A1* | 9/2013 | Sasaki | H01M 4/48 |
| | | | 429/199 |

FOREIGN PATENT DOCUMENTS

| | | |
|---|---|---|
| JP | 02-006339 A1 | 1/1990 |
| JP | 2003-308893 A1 | 10/2003 |
| JP | 2006-172758 A1 | 6/2006 |
| JP | 2008-204956 A1 | 9/2008 |
| JP | 2009-135025 A1 | 6/2009 |
| JP | 2009-283429 A1 | 12/2009 |
| JP | 2012-252873 A1 | 12/2012 |
| TW | 200915583 A | 4/2009 |

OTHER PUBLICATIONS

Nonaka et al "Raman spectra of sol-gel-derived tungsten oxide", Journal of Materials Science Letters 12 (1993) 274-277.*
Su et al "Structure and optical properties of tungsten oxide nanomaterials prepared by a modified plasma arc gas condensation technique", J. Nanopart. Res. (2010) 12:1755-1763.*
Su, Cherng-Yuh, et al. "Oxygen Partial Pressure Effect on the Preparation of Nanocrystalline Tungsten Oxide Powders by a Plasma Arc Gas Condensation Technique," *International Journal of Refractory Metals & Hard Materials*, vol. 26 (2008), pp. 423-428 (6 pages).
Taiwanese Office Action, dated Mar. 26, 2014 (9 pages).
International Preliminary Report on Patentability (Application No. PCT/JP2013/056485) dated Oct. 9, 2014.
International Search Report (Application No. PCT/JP2013/056485) dated May 21, 2013.
Chinese Office Action (Application No. 201380016671.0) dated Jul. 7, 2016 (with English translation).

* cited by examiner

ELECTRODE MATERIAL FOR BATTERIES, ELECTRODE MATERIAL PASTE FOR BATTERIES, METHOD FOR MANUFACTURING THE ELECTRODE MATERIAL FOR BATTERIES, DYE-SENSITIZED SOLAR CELL, AND STORAGE BATTERY

BACKGROUND OF THE INVENTION

Field of the Invention

The present invention relates to an electrode material for batteries, an electrode material paste for batteries, a method for manufacturing the electrode material for batteries, a dye-sensitized solar cell, and a storage battery.

Description of Related Art

In recent years, solar cells for which solar energy available as natural energy can be utilized have been a focus of attention.

Initially, a silicon-based solar cell has been used mainly as the solar cell. The silicon-based solar cell has the advantage of being able to achieve a power generation efficiency of no less than 10%.

Vacuum film-forming techniques, such as the crystal growth of silicon and sputtering, are frequently used, however, in order to manufacture the silicon-based solar cell. Accordingly, the silicon-based solar cell is high in manufacturing cost.

Hence, as a technology in which the manufacturing cost of solar cells is decreased, studies are being made of a dye-sensitized solar cell formed by fixating a light-absorbing dye on the surfaces of fine particles of a semiconductor other than silicon. This dye-sensitized solar cell is fabricated by fixating a dye on the surfaces of semiconductor fine particles. Accordingly, paste coating techniques are frequently used in the fabrication of the dye-sensitized solar cell.

For example, Patent Document 1 (Japanese Patent Laid-Open No. 2008-204956) describes that a specific degree of power generation efficiency can be attained by using titanium oxide powder as an electrode material and fixating a dye on the particle surfaces of this titanium oxide powder. According to the technique described in Patent Document 1, it is possible to reduce manufacturing costs.

Since a solar cell literally uses solar light, the amount of electrical generation varies depending on the amount of solar insolation. Accordingly, the solar cell has been problematic in that if the amount of solar insolation drastically decreases, as in the case of, for example, the solar cell being moved from an outdoor location into an indoor location during daytime hours, the amount of electrical generation drastically decreases as well.

As a technology to cope with such a change in the amount of solar insolation, Patent Document 2 (Japanese Patent Laid-Open No. 2009-135025) describes a technique of providing a dye-sensitized solar cell with an electricity storage function by disposing a solid electricity storage layer on a photoelectric conversion layer.

PRIOR ART DOCUMENTS

Patent Documents

Patent Document 1: Japanese Patent Laid-Open No. 2008-204956

Patent Document 2: Japanese Patent Laid-Open No. 2009-135025

SUMMARY OF THE INVENTION

Problems to be Solved by the Invention

It is difficult, however, to satisfy both of power generation efficiency and electricity storage efficiency at a high level simply by laminating the solar cell with two layers, i.e., the photoelectric conversion layer and the solid electricity storage layer, as described in Patent Document 2. What is important for the effective use of solar light is to improve electricity storage efficiency.

An object of the present invention, which has been accomplished in view of the above-described circumstances, is to provide an electrode material for batteries high in electricity storage efficiency, electrode material paste for batteries comprising this electrode material for batteries, a method for manufacturing the electrode material for batteries, a dye-sensitized solar cell using the electrode material for batteries, and a storage battery.

Means for Solving the Problems

The present invention has been accomplished by finding out that tungsten oxide powder the characteristics of which measured by a Raman spectroscopic analysis method are within a determinable range is high in electricity storage efficiency.

An electrode material for batteries of the present invention, which is intended to solve the above-described problem, is an electrode material for batteries made from tungsten oxide powder, and the tungsten oxide powder has a first peak present within a wavenumber range of 268 to 274 $cm^{-1}$, a second peak present within a wavenumber range of 630 to 720 $cm^{-1}$, and a third peak present within a wavenumber range of 800 to 810 $cm^{-1}$, when a Raman spectroscopic analysis method is performed on the electrode material.

In addition, an electrode material paste for batteries, which is intended to solve the above-described problem, contains the electrode material for batteries.

Yet additionally, a method for manufacturing the electrode material for batteries of the present invention, which is intended to solve the above-described problem, is a method for manufacturing the above-described electrode material for batteries and comprises: a step of preparing metallic tungsten powder or tungsten compound powder; and a plasma treatment step of plasma-treating the metallic tungsten powder or the tungsten compound powder in an oxygen-containing ambient atmosphere.

Still additionally, a dye-sensitized solar cell of the present invention, which is intended to solve the above-described problem, uses the above electrode material for batteries.

Still additionally, a storage battery of the present invention, which is intended to solve the above-described problem, uses the electrode material for batteries.

Advantages of the Invention

The electrode material for batteries, the dye-sensitized solar cell and the storage battery of the present invention are high in electricity storage efficiency.

According to the electrode material for batteries, the electrode material paste for batteries, and the method for manufacturing the electrode material for batteries of the present invention, it is possible to manufacture an electrode material for batteries, a dye-sensitized solar cell, and a storage battery high in electricity storage efficiency.

DETAILED DESCRIPTION OF THE INVENTION

Electrode Material for Batteries

Figure 1:
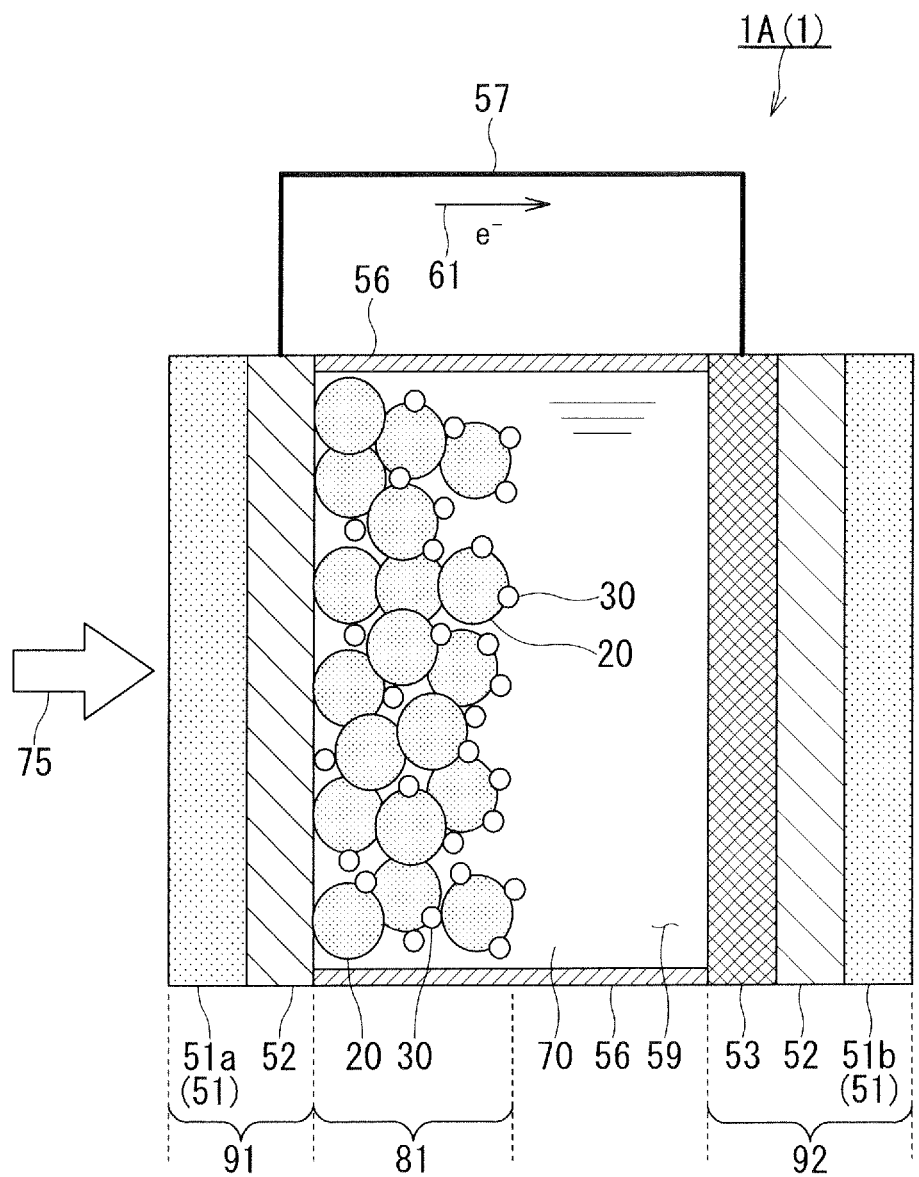
FIG. 1 is a cross-sectional view showing a first embodiment of a dye-sensitized solar cell of the present invention.

The electrode material for batteries of the present invention is composed of tungsten oxide ($WO_3$) powder. Tungsten oxide powder which is the electrode material for batteries of the present invention has at least the first peak, the second peak and the third peak to be described below when a Raman spectroscopic analysis method is performed on the tungsten oxide powder. The electrode material for batteries of the present invention is high in electricity storage efficiency if the electrode material has at least the first peak, the second peak and the third peak to be described below.

As the measuring conditions of the Raman spectroscopic analysis method, the peaks are measured by using, for example, a microscopic laser Raman spectral device, setting the measurement mode thereof to "Microscopic Raman", and using an $Ar^+$ laser having a wavelength of 514.5 nm as a light source. As the microscopic laser Raman spectral device, it is possible to use, for example, PDP-320 made by Photon Design Corporation.

(First Peak)

The first peak is a peak present within the wavenumber range of 268 to 274 $cm^{-1}$.

A half-value width (half band width) of the first peak is normally 8 to 25 $cm^{-1}$, and preferably 12 to 18 $cm^{-1}$.

If the half-value width of the first peak is less than 8 $cm^{-1}$, the electricity storage efficiency of the electrode material for batteries of the present invention is liable to be low.

If the half-value width of the first peak exceeds 25 $cm^{-1}$, the electrode material for batteries of the present invention is liable to agglutinate and, consequently, degrade in electricity storage efficiency.

(Second Peak)

The second peak is a peak present within the wavenumber range of 630 to 720 $cm^{-1}$.

A half-value width of the second peak is normally 15 to 75 $cm^{-1}$, and preferably 15 to 40 $cm^{-1}$.

If the half-value width of the second peak is less than 15 $cm^{-1}$, the electricity storage efficiency of the electrode material for batteries of the present invention is liable to be low.

If the half-value width of the second peak exceeds 75 $cm^{-1}$, the electrode material for batteries of the present invention is liable to agglutinate and, consequently, degrade in electricity storage efficiency.

(Third Peak)

The third peak is a peak present within the wavenumber range of 800 to 810 $cm^{-1}$.

A half-value width of the third peak is normally 15 to 50 $cm^{-1}$, and preferably 15 to 30 $cm^{-1}$.

If the half-value width of the third peak is less than 15 $cm^{-1}$, the electricity storage efficiency of the electrode material for batteries of the present invention is liable to be low.

If the half-value width of the third peak exceeds 50 $cm^{-1}$, the electrode material for batteries of the present invention is liable to agglutinate and, consequently, degrade in electricity storage efficiency.

The tungsten oxide powder which is the electrode material for batteries of the present invention preferably further has the fourth peak or the fifth peak to be described below, in addition to the above-described first peak, second peak and third peak, when a Raman spectroscopic analysis method is performed on the tungsten oxide powder.

(Fourth Peak)

The fourth peak is a peak present within the wavenumber range of 130 to 140 $cm^{-1}$.

The fourth peak is normally 0.10 or higher, preferably 0.12 to 0.3, and even more preferably 0.17 to 0.3 in intensity ratio ($I_4/I_3$) which is the ratio of the intensity $I_4$ of the fourth peak to the intensity $I_3$ of the third peak.

The intensity ratio ($I_4/I_3$) is preferably 0.10 or higher, since both the electricity storage efficiency and power generation efficiency of tungsten oxide powder which is the electrode material for batteries upgrade when a dye is fixated on the particle surfaces of the tungsten oxide powder. Using tungsten oxide powder as an electrode material for batteries in a storage battery to be described later is effective in also increasing electricity storage capacity to 1500 $C/m^2$ or higher.

The tungsten oxide powder which is the electrode material for batteries of the present invention is produced after being made to go through at least a plasma treatment step, as will be described later. The tungsten oxide powder which is the electrode material for batteries of the present invention is produced by further carrying out a rapid cooling step or a heat treatment step, as necessary, following the plasma treatment step.

Among the types of tungsten oxide powder which is the electrode material for batteries of the present invention, tungsten oxide powder the intensity ratio ($I_4/I_3$) of which is 0.10 or higher and which is high in both electricity storage efficiency and power generation efficiency when a dye is fixated on the particle surfaces of the tungsten oxide powder can generally be produced by carrying out at least a heat treatment step following the plasma treatment step.

(Fifth Peak)

The fifth peak is a peak present within the wavenumber range of 930 to 940 $cm^{-1}$.

The fifth peak is normally 0.04 or higher in intensity ratio ($I_5/I_3$) which is the ratio of the intensity $I_5$ of the fifth peak to the intensity $I_3$ of the third peak.

The intensity ratio ($I_5/I_3$) is preferably 0.04 or higher, since the tungsten oxide powder which is the electrode material for batteries is particularly high in electricity storage efficiency. This intensity ratio is particularly effective in obtaining a storage battery having electricity storage capacity lower than 1500 $C/m^2$.

Among the types of tungsten oxide powder which is the electrode material for batteries of the present invention, tungsten oxide powder the intensity ratio ($I_5/I_3$) of which is 0.04 or higher and which is particularly high in electricity storage efficiency can generally be produced by not carrying out a heat treatment step following the plasma treatment step.

(BET Specific Surface Area)

The tungsten oxide ($WO_3$) powder which is the electrode material for batteries of the present invention is normally 15 $m^2/g$ or larger, and preferably 20 to 150 $m^2/g$ in BET specific surface area.

Tungsten oxide powder having a BET specific surface area of 15 $m^2/g$ or larger is high in electricity storage efficiency.

(Advantageous Effects of Electrode Material for Batteries)

The tungsten oxide powder which is the electrode material for batteries of the present invention is high in electricity storage efficiency. According to the tungsten oxide powder which is the electrode material for batteries of the present invention, it is therefore possible to obtain a dye-sensitized solar cell or a storage battery having high electricity storage efficiency.

[Method for Manufacturing Electrode Material for Batteries]

Next, a description will be made of a method for manufacturing the electrode material for batteries of the present invention. The method for manufacturing the electrode material for batteries of the present invention comprises at least a plasma treatment step.

(Plasma Treatment Step)

The plasma treatment step is a step of plasma-treating metallic tungsten powder or tungsten compound powder in an oxygen-containing ambient atmosphere.

Specifically, the plasma treatment step is a step of sublimating metallic tungsten powder or tungsten compound powder which is a raw material by plasma treatment in an oxygen-containing ambient atmosphere.

In the plasma treatment step, sublimation by plasma treatment is performed in an oxygen ambient atmosphere. Metallic tungsten powder or tungsten compound powder is thus instantaneously sublimated to generate gas-phase metallic tungsten vapor from the solid-phase powder. This metallic tungsten vapor is oxidized to obtain fine tungsten oxide ($WO_3$) powder. The fine tungsten oxide ($WO_3$) powder is available since gas-phase oxidation reaction is utilized.

<Metallic Tungsten Powder and Tungsten Compound Powder>

As metallic tungsten powder for use in the plasma treatment step, powdery metallic tungsten is used. As tungsten compound powder for use in the plasma treatment step, tungsten oxide, such as tungsten trioxide ($WO_3$) or tungsten dioxide ($WO_2$), tungsten carbide, ammonium tungstate, calcium tungstate, or tungsten acid, for example, is used.

A raw material used in the plasma treatment step is preferably metallic tungsten powder, tungsten trioxide powder, tungsten carbide powder or ammonium tungstate powder. If metallic tungsten powder, tungsten trioxide powder, tungsten carbide powder or ammonium tungstate powder is used as the raw material, tungsten trioxide powder obtained after the raw material is sublimated in an oxygen ambient atmosphere is less likely to contain impurities. In addition, in the case of metallic tungsten powder, tungsten trioxide powder and tungsten carbide powder, any harmful substances are less likely to be formed as by-products, i.e., substances other than tungsten trioxide, formed after a sublimation step.

Metallic tungsten powder or tungsten compound powder which is the raw material used in the plasma treatment step has an average particle diameter $D_{50}$ of 10 μm or smaller, and preferably 1 to 5 μm.

If the average particle diameter $D_{50}$ of metallic tungsten powder or tungsten compound powder serving as the raw material exceeds 10 μm, it becomes difficult to uniformly feed the metallic tungsten powder or the tungsten compound powder into plasma flame. Accordingly, a uniform plasma treatment is not feasible, and therefore, a variation (scattering) is liable to occur in the particle diameter of tungsten oxide ($WO_3$) powder obtained after the plasma treatment step.

On the other hand, if the average particle diameter $D_{50}$ of metallic tungsten powder or tungsten compound powder serving as the raw material is smaller than 1 μm, it is difficult to prepare the metallic tungsten powder or the tungsten compound powder. Accordingly, the manufacturing cost of the electrode material tends to be high.

<Plasma Treatment>

As the plasma treatment, an inductively-coupled plasma treatment, for example, is used. The inductively-coupled plasma treatment is preferred since a large amount of raw material powder is oxidized at a time in an oxygen ambient atmosphere, and therefore, a large amount of tungsten oxide ($WO_3$) powder can be easily obtained at a time. This is because in a plasma treatment such as the inductively-coupled plasma treatment, the amount of raw material that can be treated at a time can be controlled by adjusting the area of plasma generation.

In the plasma treatment, a method is used generally in which plasma is generated in an oxygen ambient atmosphere composed of argon and oxygen gases, and then metallic tungsten powder or tungsten compound powder is supplied into this plasma.

As a method for supplying metallic tungsten powder or tungsten compound powder into plasma, a method is used, for example, in which metallic tungsten powder or tungsten compound powder is blown into the plasma along with a carrier gas, or a method in which a dispersion liquid prepared by dispersing metallic tungsten powder or tungsten compound powder in a predetermined liquid dispersion medium is blown into the plasma.

Examples of the carrier gas used in the method for blowing metallic tungsten powder or tungsten compound powder into the plasma may include air, oxygen, and an oxygen-containing inert gas. Among the examples, air is preferred since it is low-cost. If oxygen is sufficiently contained in a reaction field as in cases where an oxygen-containing reactant gas is flowed in addition to the carrier gas or the tungsten compound powder is made from tungsten trioxide, an inert gas, such as argon or helium, may be used as the carrier gas.

In a case where the method for blowing in the dispersion liquid prepared by dispersing metallic tungsten powder or tungsten compound powder into the predetermined liquid dispersion medium is adopted, a liquid dispersion medium containing oxygen atoms in the molecule is used as the dispersion medium for use in the production of a dispersion liquid composed of metallic tungsten powder or tungsten compound powder. Use of the dispersion liquid is preferred since raw material powder is easy to handle. As the liquid dispersion medium containing oxygen atoms in the molecule, a dispersion medium containing 20% by volume or more of at least one of water and alcohol, for example, is used.

As alcohol for use in the liquid dispersion medium, at least one type of alcohol selected from the group consisting of methanol, ethanol, 1-propanol and 2-propanol is used. Water and alcohol are preferred since they do not disturb the sublimation and oxidation reactions of raw material powder as they are easily vaporized by the heat of plasma, and since they easily facilitate oxidation reactions as they contain oxygen in their molecules.

The center temperature of plasma flame used in the plasma treatment is normally set to 8000° C. or higher, and preferably 10000° C. or higher. Use of high-temperature plasma flame having a center temperature of 8000° C. or higher is preferred since tungsten oxide ($WO_3$) powder obtained becomes fine.

In the plasma treatment step, tungsten oxide ($WO_3$) powder is obtained as the result of metallic tungsten vapor generated by sublimating metallic tungsten in plasma flame being oxidized by oxygen in an oxygen ambient atmosphere. Thus obtained the tungsten oxide ($WO_3$) powder flies out of plasma flame. Tungsten oxide ($WO_3$) powder having flown out of plasma flame may be left to cool. In the method for manufacturing the electrode material for batteries of the present invention, however, it is preferable to carry out a rapid cooling step of rapidly cooling the tungsten oxide ($WO_3$) powder having flown out of plasma flame. That is, the rapid cooling step is preferably carried out following the plasma treatment step in the method for manufacturing the electrode material for batteries of the present invention.

(Rapid Cooling Step)

A rapid cooling step is a step of rapidly cooling tungsten oxide ($WO_3$) powder obtained in a plasma treatment step and having flown out of plasma flame.

Carrying out the rapid cooling step following the plasma treatment step makes it easy for the obtained tungsten oxide ($WO_3$) powder to be high in electricity storage efficiency.

The rapid cooling treatment of the rapid cooling step is performed in a rapid cooling area located between a surface of plasma flame and a surface away at a predetermined distance from this surface. The rapid cooling area is provided so that a rapid cooling distance which is a distance at which tungsten oxide ($WO_3$) powder flying out of plasma flame is rapidly cooled is normally 1 m or longer, and preferably 1.5 to 2 m.

The rapid cooling area is set so that the cooling rate of tungsten oxide ($WO_3$) powder flying out of plasma flame is 1000° C./s or higher.

In the method for manufacturing the electrode material for batteries of the present invention, a heat treatment step is preferably further carried out following the plasma treatment step or the rapid cooling step.

(Heat Treatment Step)

A heat treatment step is a step of performing a heat treatment at 300 to 1000° C. in an oxygen-containing ambient atmosphere, following the plasma treatment step. If the rapid cooling step is carried out following the plasma treatment step, the heat treatment step is carried out following the rapid cooling step.

Tungsten oxide ($WO_3$) powder (hereinafter referred to as "non-heat treated tungsten oxide ($WO_3$) powder") obtained by carrying out a plasma treatment step or a rapid cooling step is liable to contain many lattice defects in particle surfaces, and therefore, tends to contain powder of tungsten oxide other than $WO_3$. Here, examples of tungsten oxide other than $WO_3$ may include $WO_2$ and $W_2O_3$ in which y/x of $W_xO_y$ is normally smaller than 3.

Carrying out a heat treatment step reduces or eliminates lattice defects in the surfaces of obtained tungsten oxide ($WO_3$) powder and upgrades the purity thereof to, for example, 99% or higher. In addition, carrying out a heat treatment step places the crystal structure and the particle diameter of $WO_3$ of obtained tungsten oxide ($WO_3$) powder in a state suited to improve power generation efficiency when a dye is fixated on the particle surfaces of the tungsten oxide powder. Accordingly, tungsten oxide ($WO_3$) powder obtained by carrying out a heat treatment step is high in power generation efficiency when a dye is fixated on the surfaces of the tungsten oxide powder, in addition to being high in electricity storage efficiency.

As the oxygen-containing ambient atmosphere, oxygen, atmospheric air, an inert gas in which water vapor or oxygen is introduced, or water, for example, is used. If the oxygen-containing ambient atmosphere is water, a heat treatment is performed in water. The pressure of the ambient atmosphere is not limited in particular, but is normally atmospheric pressure or higher.

A heat treatment is performed so that the maximum temperature of the non-heat treated tungsten oxide ($WO_3$) powder becomes normally 300 to 1000° C., and preferably 450 to 600° C.

The time of retaining the maximum temperature in the heat treatment is set to normally 10 minutes or longer, preferably 1 to 60 hours, and more preferably 2 to 60 hours.

If the maximum temperature of the heat treatment and the retention time of retaining the maximum temperature are within the abovementioned ranges, non-heat treated tungsten oxide ($WO_3$) powder is slowly oxidized in a temperature region low in oxidation reaction rate, thus eliminating lattice defects present in the surfaces and interiors of the tungsten oxide powder. This makes it easy to obtain tungsten oxide ($WO_3$) powder high in both electricity storage efficiency and power generation efficiency when a dye is fixated on the particle surfaces of the tungsten oxide powder.

The particle diameter of the non-heat treated tungsten oxide ($WO_3$) powder can be made all the smaller since no heat is applied thereto. Since decreasing the particle diameter of the $WO_3$ powder increases the surface area thereof, it is possible to increase the area of the powder to have contact with an electrolytic solution. On the other hand, lattice defects present in the surfaces and interiors of the $WO_3$ powder remain intact since no heat is applied thereto. The lattice defects, if left over, serve as internal resistance, and therefore, electricity storage efficiency may not improve any further. The lattice defects have significant adverse effects, in particular, when the thickness of a semiconductor layer is increased to raise electricity storage capacity. Accordingly, the tungsten oxide powder is preferably not heat-treated when used in a storage battery having electricity storage capacity lower than 1500 $C/m^2$, and is preferably heat-treated when used in a storage battery having electricity storage capacity no lower than 1500 $C/m^2$.

If the maximum temperature of the heat treatment is too high, a reaction rate is high at surface sites of the tungsten oxide powder, and therefore, the degree of elimination of lattice defects tends to differ for each particle of non-heat treated tungsten oxide ($WO_3$) powder. Consequently, lattice defects present in surfaces and interiors of particles are liable to remain intact in tungsten oxide ($WO_3$) powder obtained after the heat treatment. Too high a maximum temperature is therefore not preferable.

If the maximum temperature of the heat treatment exceeds 1000° C. in particular, $WO_3$ particles exhibit drastic particle growth, thus causing a variation in the diameter of particles. Consequently, it is difficult to obtain tungsten oxide ($WO_3$) powder high in both electricity storage efficiency and power generation efficiency when a dye is fixated on the particle surfaces of the tungsten oxide powder.

The heat treatment is performed by means of, for example, atmosphere thermal conduction, radiation heat, high-frequency irradiation, microwave irradiation, or laser light irradiation. A heat treatment by means of radiation heat is performed using, for example, an electric furnace.

Preferred examples of the heat treatment in the heat treatment step are a heat treatment in the atmosphere, a heat treatment in a pressurized ambient atmosphere, a heat treatment in water, and a microwave heat treatment. That is, the heat treatment step is preferably a step in which one type of treatment selected from the group consisting of a heat treatment in the atmosphere, a heat treatment in a pressurized ambient atmosphere, a heat treatment in water, and a microwave heat treatment is performed.

The heat treatment in the atmosphere is a heat treatment performed in the atmosphere, and is performed using, for example, an electric furnace in which atmospheric air is introduced into a chamber.

The heat treatment in a pressurized ambient atmosphere is a heat treatment performed in a pressurized ambient atmosphere, and is performed using, for example, an electric furnace in which the inner side of a chamber is set to a pressurized ambient atmosphere.

The heat treatment in water is a heat treatment performed with the non-heat treated tungsten oxide ($WO_3$) powder which is an object of the heat treatment dispersed in water, and is performed by means of, for example, the irradiation of high-frequency waves, microwaves, or laser light.

The microwave heat treatment is performed using, for example, a microwave heating device.

Carrying out the above-described steps can provide tungsten oxide ($WO_3$) powder which is the electrode material for batteries of the present invention.

(Advantageous Effects of Method for Manufacturing Electrode Material for Batteries)

According to the method for manufacturing the electrode material for batteries of the present invention, it is possible to efficiently manufacture tungsten oxide powder which is the electrode material for batteries of the present invention.

[Electrode Material Paste for Batteries]

The electrode material paste for batteries of the present invention contains the electrode material for batteries of the present invention.

Specifically, the electrode material paste for batteries of the present invention contains the electrode material for batteries of the present invention, a binder, and a solvent.

As the binder, a binder the pyrolysis rate of which at 500° C. is, for example, 99.0% or higher is used. A binder having a pyrolysis rate of 99.0% or higher at 500° C. is preferred since damage is less likely to be caused to a substrate, such as a glass substrate, when the electrode material paste for batteries is coated on the substrate. Here, a pyrolysis rate at 500° C. means a pyrolysis rate when the binder is heat-treated at 500° C. for 30 minutes. The symbol % in pyrolysis rates refers to percent by mass.

The electrode material paste for batteries coated on a substrate, such as a glass substrate, is heating-treated to remove the binder and the solvent. Consequently, the electrode material for batteries is attached firmly onto the substrate. At this time, if the temperature of the heating treatment is too high, damage is liable to occur because, for example, the substrate, such as a glass substrate, may turn soft and become deformed or the properties of the material may change. If a binder having a pyrolysis rate of 99.0% or higher at 500° C. is used, damage such as deformation or property variation, is less likely to be caused to the substrate, such as a glass substrate.

As the binder having a pyrolysis rate of 99.0% or higher at 500° C., ethyl cellulose or polyethylene glycol, for example, is used.

As the solvent, alcohol, an organic solvent, or pure water, for example, is used. Among them, an alcohol-based solvent is preferred. Among alcohol-based solvents, terpineol is preferred.

Assuming that the total amount of the electrode material for batteries, the binder and the solvent is 100% by mass, the electrode material paste for batteries is normally 5 to 50% by mass, preferably 20 to 40% by mass, and more preferably 30 to 40% by mass in the blending ratio of the electrode material.

If the blending ratio of the electrode material for batteries in the electrode material paste for batteries is 5 to 50% by mass, the electrode material paste for batteries is superior in handleability.

When calculating the blending ratio of the electrode material for batteries in the electrode material paste for batteries, the ingredient amount of the electrode material for batteries is generally calculated from the mass of tungsten oxide alone. If any additive adheres to surfaces of powder particles made from tungsten oxide or any coating film is formed on the surfaces, however, the mass of the electrode material including the additive and the coating film should be adjusted to within the abovementioned range.

Assuming that the total amount of the electrode material for batteries, the binder and the solvent is 100% by mass, the electrode material paste for batteries is normally 3 to 30% by mass, preferably 4 to 20% by mass, and more preferably 4 to 10% by mass in the blending ratio of the binder.

The electrode material paste for batteries is normally 800 to 10000 cps, and preferably 3000 to 7000 cps in viscosity at 25° C.

The electrode material paste for batteries is prepared by mixing the electrode material for batteries, the binder and the solvent.

As the order of mixing (blending), it is generally preferable to mix the binder and the solvent first, and then add the electrode material for batteries. It is not preferable to mix the electrode material for batteries, the binder and the solvent at one time since many aggregates are contained in the electrode material paste for batteries thus obtained.

It is preferable to sufficiently agitate (stir) the binder and the solvent when mixing the binder and the solvent and adding the electrode material for batteries. The reason for this is that insufficient agitation gives rise to aggregates since the electrode material for batteries of the present invention is powder made of fine particles having a BET specific surface area of 15 $m^2$/g or larger.

The electrode material paste for batteries is coated on a surface of a transparent conductive film, electrode, electricity generation layer or the like formed on a surface of, for example, a glass substrate using a screen printing method or the like, and then calcinated (baked) at a temperature of 500° C. or lower. As the result of this calcination, the binder and the solvent contained in the electrode material paste for batteries are removed or decomposed and the particles of the electrode material for batteries firmly bond to one another, thus forming an electricity storage layer composed of the electrode material for batteries.

Here, the electricity generation layer refers to a layer which generates electricity when exposed to the irradiation of light, such as solar light. The electricity generation layer is a layer composed of, for example, an anchoring structure formed as the result of the particles of a photoelectric conversion material being firmly bonded to one another due to necking or the like. Here, the photoelectric conversion material refers to a material having photoelectric conversion properties. As the photoelectric conversion material, there is used at least one type of material selected from the group consisting of, for example, titanium oxide, tin oxide, tungsten oxide, zinc oxide, zirconium dioxide, neodymium oxide, hafnium oxide, strontium oxide, indium oxide, cerium oxide, yttrium oxide, lanthanum oxide, vanadium oxide, niobium oxide, and tantalum oxide.

The electricity storage layer refers to a layer composed of an anchoring structure formed as the result of the particles of the electrode material for batteries being necking-bonded to one another and having an electricity storage effect.

If a dye to be fixated on a surface of the electricity generation layer of a dye-sensitized solar cell is firmly fixed on a surface of the electrode material for batteries composing the anchoring structure in the electricity storage layer, it is possible to form an electricity generation and storage layer. The electricity generation and storage layer is a layer which generates electricity when exposed to the irradiation of light, such as solar light, and has an electricity storage effect.

In order to settle the surface potential of the electrode material for batteries used in the electricity storage layer or the electricity generation and storage layer or to improve the necking-bondability of the particles of the material to one another, it is effective to dispose a metal oxide coating film on the electrode material for batteries or add second powder made from metal oxide to the electrode material. Examples of the metal oxide coating film include those made from metal oxides, such as yttrium oxide and cerium oxide. Examples of the second powder include metal oxide powder made from metal oxides, such as magnesium oxide, cobalt oxide, manganese oxide, yttrium oxide, and ITO.

(Advantageous Effects of Electrode Material Paste for Batteries)

According to the electrode material paste for batteries of the present invention, it is possible to form an electricity storage layer or an electricity generation and storage layer high in electricity storage efficiency.

Hence, according to the electrode material paste for batteries of the present invention, it is possible to efficiently fabricate a storage battery or a dye-sensitized solar cell high in electricity storage efficiency.

[Dye-Sensitized Solar Cell]

The dye-sensitized solar cell of the present invention uses the electrode material for batteries of the present invention.

The dye-sensitized solar cell of the present invention is a concept that encompasses a first dye-sensitized solar cell including an electricity generation and storage layer formed using an electrode material for batteries on a surface of which a dye of the dye-sensitized solar cell is fixated, and a second dye-sensitized solar cell including an electricity generation layer and an electricity storage layer formed on a surface of this electricity generation layer as the result of the particles of the electrode material for batteries being necking-bonded to one another.

(First Dye-Sensitized Solar Cell)

The first dye-sensitized solar cell will be described with reference to the accompanying drawings. FIG. 1 is a cross-sectional view of the first dye-sensitized solar cell of the present invention.

As illustrated in FIG. 1, a first dye-sensitized solar cell 1A comprises: an electricity generation-side complex 91; a non-electricity generation-side complex 92 disposed oppositely to the electricity generation-side complex 91, and a spacer 56 for externally dividing off a space 59 formed between the electricity generation-side complex 91 and the non-electricity generation-side complex 92, wherein an electricity generation and storage layer 81 is formed within the space 59.

The electricity generation-side complex 91 is such that a transparent conductive film 52 is formed on a surface of a glass substrate 51a. The non-electricity generation-side complex 92 is such that a transparent conductive film 52 and a Pt counter electrode 53 are formed in this order on a surface of a glass substrate 51b. As the material of the transparent conductive films 52, for example, ITO, ATO or FTO is used.

The electricity generation-side complex 91 and the non-electricity generation-side complex 92 are disposed so that the transparent conductive film 52 of the electricity generation-side complex 91 and the Pt counter electrode 53 of the non-electricity generation-side complex 92 face to each other. The Pt counter electrode 53 is formed by, for example, sputtering Pt onto a surface of the transparent conductive film 52.

It is possible to use an electroconductive organic material in place of the Pt counter electrode. Examples of the electroconductive organic material include polyethylenedioxythiophene (PEDOT). The electricity generation-side complex 91 and the non-electricity generation-side complex 92 are preferably arranged away from each other at a distance of, for example, 30 to 300 µm. If the electricity generation-side complex 91 and the non-electricity generation-side complex 92 are arranged away from each other at a distance longer than 300 µM, the separation distance between the electricity generation-side complex 91 and the non-electricity generation-side complex 92 is preferably no longer than 20 times the thickness of the electricity generation and storage layer 81. If the electricity generation-side complex 91 and the non-electricity generation-side complex 92 are arranged away from each other at a distance longer than 20 times the thickness of the electricity generation and storage layer 81, the electricity generation and storage layer 81 and the Pt counter electrode 53 are located too far away from each other. This arrangement may therefore degrade power generation efficiency and electricity storage efficiency.

The spacer 56 for externally dividing off the space 59 formed between the electricity generation-side complex 91 and the non-electricity generation-side complex 92 are disposed between the transparent conductive film 52 of the electricity generation-side complex 91 and the Pt counter electrode 53 of the non-electricity generation-side complex 92. The spacer 56 is composed of synthetic resin, such as ionomer resin.

An electrolytic solution 70 is sealed in the space 59 divided off by the electricity generation-side complex 91, the non-electricity generation-side complex 92 and the spacer 56.

The transparent conductive film 52 of the electricity generation-side complex 91 and the Pt counter electrode 53 of the non-electricity generation-side complex 92 are electrically connected to each other with a lead wire 57 disposed on an outer side surface of the spacer 56.

In the first dye-sensitized solar cell 1A, the electricity generation and storage layer 81 is formed on a surface of the transparent conductive film 52 of the electricity generation-side complex 91 within the space 59 divided off by the electricity generation-side complex 91, the non-electricity generation-side complex 92 and the spacer 56.

<Electricity Generation and Storage Layer>

The electricity generation and storage layer 81 is a layer in which a dye 30 of the dye-sensitized solar cell is fixated on a surface of the electrode material 20 for batteries in an anchoring structure formed as the result of the particles of the electrode material 20 for batteries being necking-bonded to one another. The electricity generation and storage layer 81 generates electricity when exposed to the irradiation of light, such as solar light, and has an electricity storage effect.

As the dye 30 of the dye-sensitized solar cell, a ruthenium-based dye, for example, is used. As the ruthenium-based dye, a dye prepared by drying a dye solution N719 made by Sigma-Aldrich Co. LLC., for example, is used.

In the electricity generation and storage layer 81, voids are formed among the particles of the electrode material 20 for batteries on a surface of which the dye 30 is fixated. Voids are normally 5 nm or larger in size. Here, the void size is determined by taking a magnified photograph (100000× magnification or higher) of the electricity generation and storage layer corresponding to a 1 µm×3 µm cross section thereof. The void size is thus defined as the longest diagonal line of a void shown in this magnified photograph. In the magnified photograph, the electrode material and the voids can be distinguished from each other by a difference in contrast.

The electricity generation and storage layer 81 is normally 20 to 80% by volume in voidage (void ratio). Here, voidage is determined by taking a magnified photograph (100000× magnification or higher) of the electricity generation and storage layer corresponding to a 1 µm×3 µm cross section thereof and calculating the total area ratio (%) of voids in this magnified photograph. Voidage is thus defined as this total area ratio (%) of voids.

<Method for Manufacturing Electricity Generation and Storage Layer>

A method for manufacturing the electricity generation and storage layer 81 will be described hereunder.

First, a paste containing an electrode material for batteries, such as the electrode material paste for batteries of the present invention, is prepared.

In the paste containing the electrode material for batteries, the blending ratio of the binder when the total amount of the electrode material for batteries, the binder and the solvent is 100% by mass is normally 3 to 30% by mass in general, as described above, since the voidage of the electricity generation and storage layer 81 is likely to be 20 to 80% by volume, thus being preferable.

Next, the paste containing the electrode material for batteries is coated on a surface of the transparent conductive film 52 of the electricity generation-side complex 91 using a screen printing method or the like. Coating is preferably performed a plural number of times until a required thickness is reached.

In addition, the electricity generation-side complex 91 on which the paste containing the electrode material for batteries is coated is calcinated (baked). Thus, an anchoring structure formed as the result of the particles of the electrode material 20 for batteries being necking-bonded to one another is formed on the surface of the transparent conductive film 52 of the electricity generation-side complex 91.

Calcination temperature is normally set to 500° C. or lower, and preferably 200 to 500° C. Calcination temperature is preferably 500° C. or lower since no damage is caused to the glass substrate 51*a*.

The rate of temperature rise at the time of calcination is preferably 100° C./h or higher since the binder in the paste containing the electrode material for batteries can be thermally decomposed all at once, and therefore, the size of voids among the particles of the electrode material 20 for batteries can be easily adjusted to 5 nm or larger.

Next, the electricity generation-side complex 91 in which the anchoring structure formed as the result of the particles of the electrode material 20 for batteries being necking-bonded to one another is formed on the surface of the transparent conductive film 52 is immersed in a solution containing the dye 30 for the dye-sensitized solar cell and then dried. Consequently, the dye 30 is fixated on a surface of the electrode material 20 for batteries, thereby to form the electricity generation and storage layer 81.

In this connection, the electrode material 20 for batteries of the anchoring structure is preferably surface-treated before the anchoring structure formed as the result of the particles of the electrode material 20 for batteries being necking-bonded to one another is immersed in the solution containing the dye 30, since the dye 30 is easily fixated on the surface of the electrode material 20 for batteries. As such surface treatment, there is used, for example, a method for forming a metal oxide film, such as a $Y_2O_3$ film, on the surface of the electrode material 20 for batteries.

The electricity generation-side complex 91 in which the electricity generation and storage layer 81 is formed is disposed oppositely to the non-electricity generation-side complex 92 fabricated separately. Thereafter, the electricity generation-side complex 91, the non-electricity generation-side complex 92 and the spacer 56 having an unillustrated electrolytic solution inlet are thermocompression-bonded and integrated with one another. In addition, the electrolytic solution 70 is injected from the electrolytic solution inlet of the spacer 56 into the space 59, the electrolytic solution inlet is sealed up with resin, and the transparent conductive film 52 and the Pt counter electrode 53 are electrically connected with the lead wire 57. Consequently, there is obtained the first dye-sensitized solar cell 1A.

The electrolytic solution 70 is preferably a mixture of an electrolytic composition and an organic solvent. In addition, the electrolytic composition is preferably a mixture of iodine and iodide. As the iodide, lithium iodide (LiI), for example, is used.

In a case where a mixture of iodine and iodide is used as the electrolytic composition, the concentration of iodine in the electrolytic solution is preferably set to 0.01 to 5.0 mol/L, and the concentration of iodide in the electrolytic solution is preferably set to 0.5 to 5.0 mol/L. Iodine and iodide concentrations within these ranges enable reductions in the migration resistance of charges in the electrolytic solution and in reaction resistance at the counter electrode.

Mixing the organic solvent with the electrolytic solution enables a reduction in the viscosity of the electrolytic composition, thereby facilitating the infiltration (penetration) of the electrolytic solution into the electricity generation and storage layer 81. As the organic solvent, cyclic carbonate and cyclic ester are preferably used. Cyclic carbonate and cyclic ester are efficient in charge exchange, and therefore, use of cyclic carbonate or cyclic ester makes available the effect of decreasing internal resistance. As cyclic carbonate, ethylene carbonate, propylene carbonate or butylene carbonate, for example, is used. As cyclic ester, γ-butyllactone, δ-valerolactone or δ-caprolactone, for example, is used.

<Operation of First Dye-Sensitized Solar Cell>

The operation of the first dye-sensitized solar cell 1A will be described hereunder with reference to the accompanying drawings.

As illustrated in FIG. 1, light 75, when radiated to a glass substrate 51*a* of the first dye-sensitized solar cell 1A, transmits through the glass substrate 51*a* and the transparent conductive film 52, and is received by the dye 30 of the electricity generation and storage layer 81.

The dye 30 is subjected to excitation suited to photoelectric conversion properties by the received light, and generates electrons. That is, the dye 30 generates electricity. Electrons generated at the dye 30 flow into the electrode material 20 for batteries of the electricity generation and storage layer 81.

Some of the electrons flowing into the electrode material 20 for batteries of the electricity generation and storage layer 81 flow into the lead wire 57 through the transparent conductive film 52 and flow through the lead wire 57 in the direction shown by reference numeral 61. The rest of the electrons flowing into the electrode material 20 for batteries of the electricity generation and storage layer 81 stays in the electrode material 20 for batteries and is stored therein.

Hence, according to the first dye-sensitized solar cell 1A, it is possible to supply electricity to external equipment even if the amount of solar insolation decreases drastically. Furthermore, it is possible to take measures, such as switchover to a general commercial power source, while supplying electricity to the external equipment by taking advantage of electricity storage functions.

(Second Dye-Sensitized Solar Cell)

Figure 2:
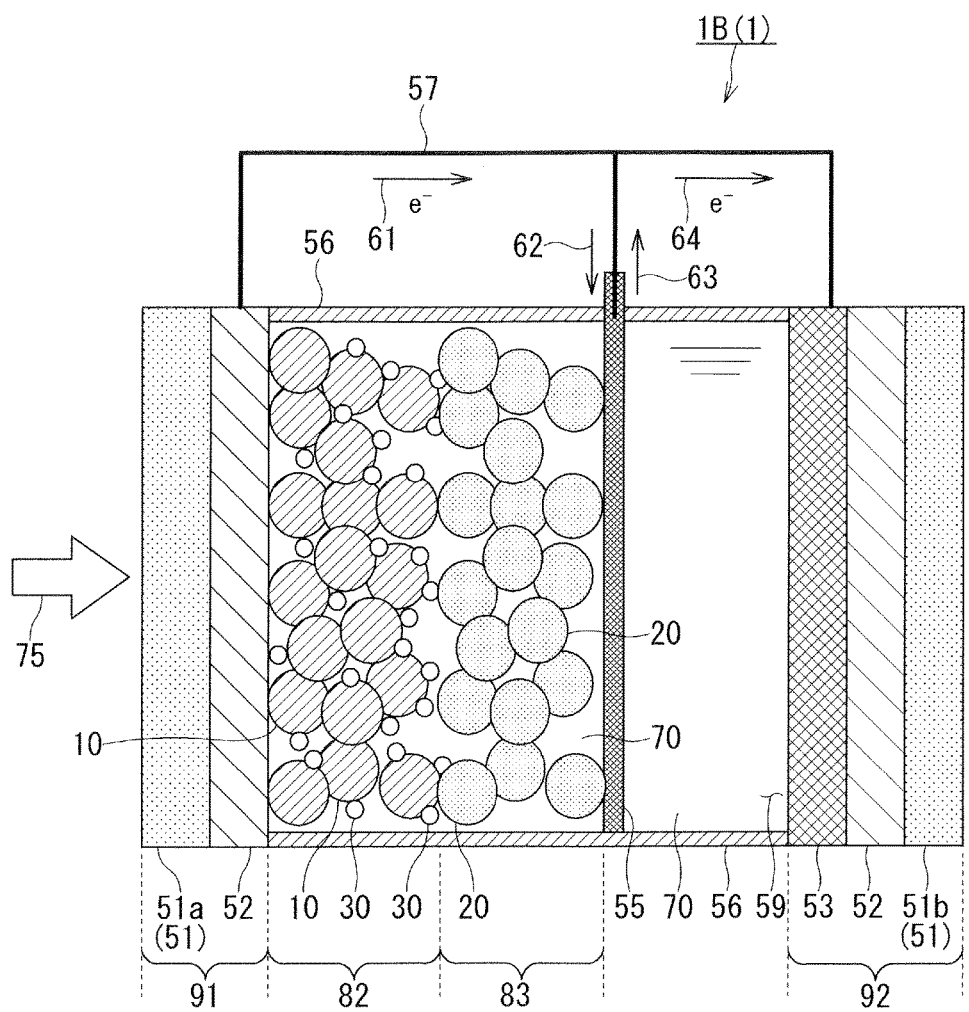
FIG. 2 is a cross-sectional view showing a second embodiment of a dye-sensitized solar cell of the present invention.

The second dye-sensitized solar cell will be described hereunder with reference to the accompanying drawings. FIG. 2 is a cross-sectional view of the second dye-sensitized solar cell of the present invention.

A second dye-sensitized solar cell 1B illustrated in FIG. 2, when compared with the first dye-sensitized solar cell 1A illustrated in FIG. 1, differs therefrom in that an electricity generation layer 82 and an electricity storage layer 83 are formed in place of the electricity generation and storage layer 81 and that a mesh-like electrode 55 having contact with a surface of the electricity storage layer 83 is disposed. The rest of the second dye-sensitized solar cell 1B is the same as the first dye-sensitized solar cell 1A illustrated in FIG. 1.

Accordingly, constituent elements, among those of the second dye-sensitized solar cell 1B illustrated in FIG. 2, which are the same as constituent elements of the first dye-sensitized solar cell 1A illustrated in FIG. 1 are denoted by the same reference numerals and characters and the description of the configuration and operation of these constituent elements will be omitted or simplified.

As illustrated in FIG. 2, the second dye-sensitized solar cell 1B comprises an electricity generation-side complex 91, a non-electricity generation-side complex 92 disposed oppositely to the electricity generation-side complex 91, and a spacer 56 for externally dividing off a space 59 formed between the electricity generation-side complex 91 and the non-electricity generation-side complex 92, wherein an electricity generation layer 82 and an electricity storage layer 83 are formed within the space 59.

A mesh-like electrode 55 is disposed on a surface of the electricity storage layer 83 within the space 59 divided off by the electricity generation-side complex 91, the non-electricity generation-side complex 92 and the spacer 56, so as to have contact with the electricity storage layer 83. The mesh-like electrode 55 is a reticular electrode formed from, for example, Ti, and allows an electrolytic solution 70 to flow in the thickness direction thereof.

A transparent conductive film 52 of the electricity generation-side complex 91 and a Pt counter electrode 53 of the non-electricity generation-side complex 92 are electrically connected to each other with a lead wire 57 disposed on the outer side surface of the spacer 56. This lead wire 57 is branched to also connect to the mesh-like electrode 55.

Consequently, the lead wire 57 is electrically connected to the transparent conductive film 52 of the electricity generation-side complex 91, the Pt counter electrode 53 of the non-electricity generation-side complex 92 and the mesh-like electrode 55.

In the second dye-sensitized solar cell 1B, the electricity generation layer 82 and the electricity storage layer 83 are formed in this order on a surface of the transparent conductive film 52 of the electricity generation-side complex 91 within the space 59 divided off by the electricity generation-side complex 91, the non-electricity generation-side complex 92 and the spacer 56.

<Electricity Generation Layer>

The electricity generation layer 82 is a layer composed of an anchoring structure formed as the result of the particles of titanium oxide ($TiO_2$) 10 serving as a photoelectric conversion material being firmly bonded to one another due to necking or the like. The electricity generation layer 82, when exposed to the irradiation of light, such as solar light, generates electricity.

Here, the photoelectric conversion material refers to a material having photoelectric conversion properties. Preferably, the photoelectric conversion material is powder.

As the photoelectric conversion material, it is possible to use at least one type of material selected from the group consisting of, for example, titanium oxide, tin oxide, tungsten oxide, zinc oxide, zirconium oxide, neodymium oxide, hafnium oxide, strontium oxide, indium oxide, cerium oxide, yttrium oxide, lanthanum oxide, vanadium oxide, niobium oxide, and tantalum oxide, in addition to the titanium oxide ($TiO_2$) as an elementary substance illustrated in FIG. 2.

<Method for Manufacturing Electricity Generation Layer>

A method for manufacturing the electricity generation layer 82 will be described hereunder.

First, titanium oxide paste containing titanium oxide ($TiO_2$) 10 serving as a photoelectric conversion material is prepared.

The titanium oxide paste contains, for example, the titanium oxide ($TiO_2$) 10, a binder, and a solvent. As the binder and the solvent for use in the titanium oxide paste, it is possible to use, for example, the same binder and solvent as used to prepare the electrode material paste for batteries of the present invention.

In the titanium oxide paste, the blending ratio of the binder when the total amount of the titanium oxide $TiO_2$ 10, the binder and the solvent is assumed to be 100% by mass is preferably 3 to 30% by mass in general, as described above, since the voidage (void ratio) of the electricity generation layer 82 is likely to be 20 to 80% by volume.

If a substance other than titanium oxide ($TiO_2$) is used as the photoelectric conversion material 10 of the electricity generation layer 82, paste containing this substance is prepared.

Next, the titanium oxide paste is coated on a surface of the transparent conductive film 52 of the electricity generation-side complex 91 using a screen printing method or the like. Coating is preferably performed a plural number of times until a required thickness is reached.

In addition, the electricity generation-side complex 91 on which the titanium oxide paste is coated is calcinated (baked). Thus, an anchoring structure formed as the result of the particles of the titanium oxide ($TiO_2$) 10 being necking-bonded to one another is formed on the surface of the transparent conductive film 52 of the electricity generation-side complex 91.

Calcination conditions are the same as those described in the method for manufacturing the electricity generation and storage layer 81 of the first dye-sensitized solar cell 1A illustrated in FIG. 1, and therefore, will not be discussed here.

<Electricity Storage Layer>

The electricity storage layer 83 is formed on a surface of the electricity generation layer 82.

The electricity storage layer 83 is a layer composed of an anchoring structure formed as the result of the particles of the electrode material 20 for batteries being necking-bonded to one another. The electricity storage layer 83 has an electricity storage effect.

The electricity storage layer 83 is normally 20 to 80% by volume in voidage. The definition of voidage is the same as that of the voidage of the electricity generation and storage layer 81.

<Method for Manufacturing Electricity Storage Layer>

A method for manufacturing the electricity storage layer 83, when compared with the method for manufacturing the electricity generation and storage layer 81 of the first dye-sensitized solar cell 1A illustrated in FIG. 1, is the same as the method except that the electricity generation-side complex 91 in which the anchoring structure is formed as the result of the particles of the electrode material 20 for batteries being necking-bonded to one another is neither immersed in the solution containing the dye 30 of the dye-sensitized solar cell nor dried thereafter. Accordingly, the method for manufacturing the electricity storage layer 83 will not be discussed here.

In the electricity generation-side complex 91 in which the electricity generation layer 82 and the electricity storage layer 83 are formed, the mesh-like electrode 55 is disposed so as to have contact with a surface of the electricity storage layer 83.

The electricity generation-side complex 91 in which the mesh-like electrode 55 is disposed is arranged oppositely to the non-electricity generation-side complex 92 fabricated separately. Thereafter, the electricity generation-side complex 91, the non-electricity generation-side complex 92 and the spacer 56 having an unillustrated electrolytic solution inlet are thermocompression-bonded and integrated with one another. In addition, the electrolytic solution 70 is injected from the electrolytic solution inlet of the spacer 56 into the space 59, the electrolytic solution inlet is sealed up with resin, and the transparent conductive film 52, the Pt counter electrode 53 and the mesh-like electrode 55 are electrically connected with the lead wire 57. Consequently, there is obtained the second dye-sensitized solar cell 1B.

<Operation of Second Dye-Sensitized Solar Cell>

The operation of the second dye-sensitized solar cell 1B will be described hereunder with reference to the accompanying drawings.

As illustrated in FIG. 2, light 75, when radiated to a glass substrate 51a of the second dye-sensitized solar cell 1B, transmits through the glass substrate 51a and the transparent conductive film 52, and is received by the dye 30 of the electricity generation layer 82.

The dye 30 is subjected to excitation suited to photoelectric conversion properties by the received light, and generates electrons. That is, the dye 30 generates electricity. Electrons generated at the dye 30 flow into the titanium oxide ($TiO_2$) 10 which is the photoelectric conversion material of the electricity generation layer 82.

Some of the electrons flowing into the titanium oxide ($TiO_2$) 10 of the electricity generation layer 82 flow into the lead wire 57 through the transparent conductive film 52 and flow through the lead wire 57 in the direction shown by reference numeral 61. The rest of the electrons flowing into the titanium oxide ($TiO_2$) 10 of the electricity generation layer 82 flows into the electricity storage layer 83 and is stored in the electrode material 20 for batteries of the electricity storage layer 83.

Hence, according to the second dye-sensitized solar cell 1B, it is possible to supply electricity to external equipment even if the amount of solar insolation decreases drastically. Furthermore, it is possible to take measures, such as switchover to a general commercial power source, while supplying electricity to the external equipment by taking advantage of electricity storage functions.

(Advantageous Effects of Dye-Sensitized Solar Cell)

The dye-sensitized solar cell of the present invention is high in electricity storage efficiency since the electrode material for batteries contained in the electricity generation and storage layer or the electricity storage layer is high in electricity storage efficiency.

[Storage Battery]

A storage battery of the present invention uses the electrode material for batteries of the present invention.

Figure 3:
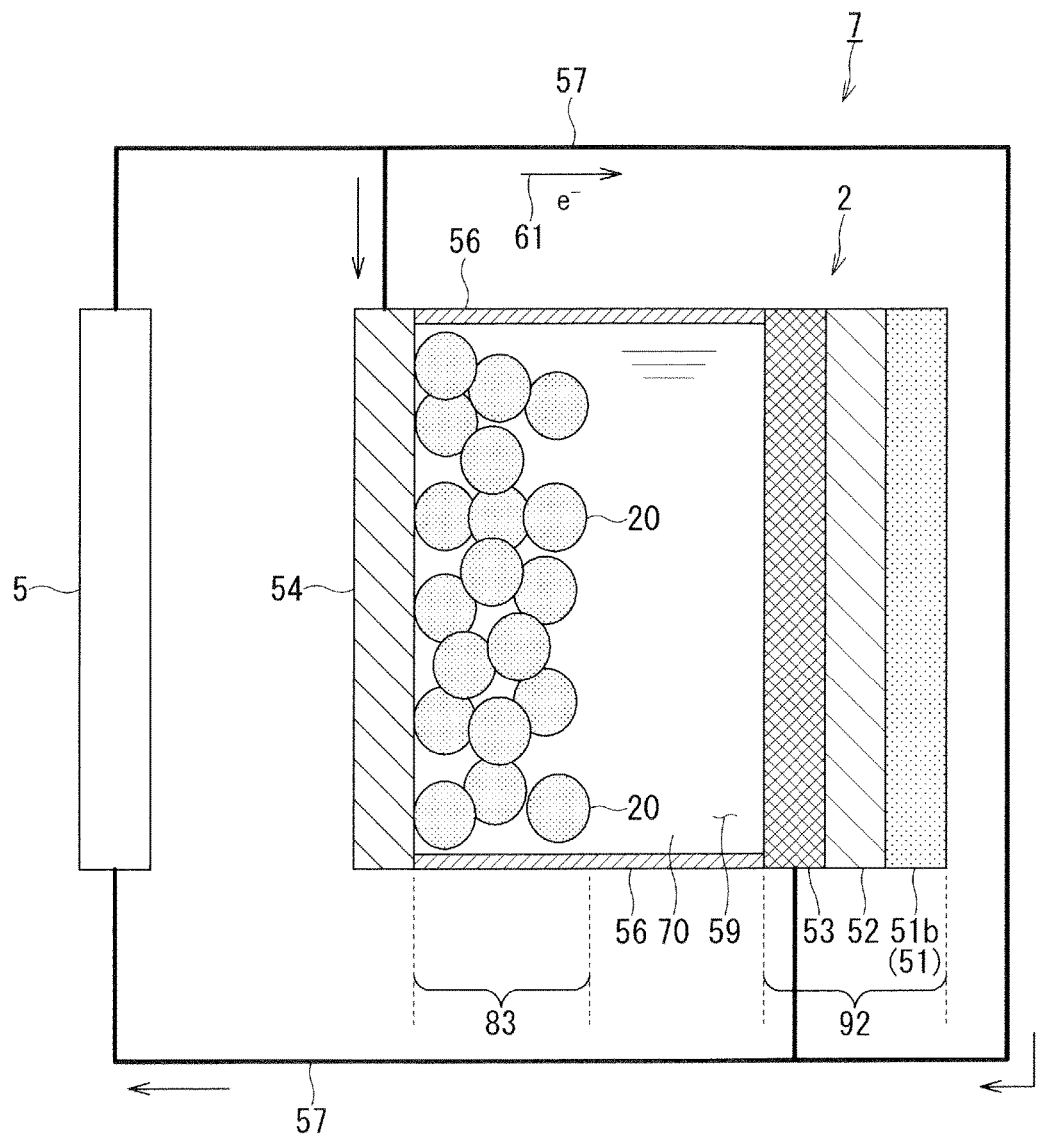
FIG. 3 is a cross-sectional view showing a storage battery of the present invention.

The storage battery of the present invention will be described hereunder with reference to the accompanying drawings. FIG. 3 is a cross-sectional view of the storage battery of the present invention.

As illustrated in FIG. 3, a storage battery 2 of the present invention comprises an electrode 54, a non-electricity generation-side complex 92 disposed oppositely to the electrode 54, and a spacer 56 for externally dividing off a space 59 formed between the electrode 54 and the non-electricity generation-side complex 92, wherein an electricity storage layer 83 is formed within the space 59.

As the result of being combined with a solar cell 5 to which the storage battery 2 is electrically connected with a lead wire 57, the storage battery 2 forms a solar cell-storage battery composite device 7 having both an electricity generation effect and an electricity storage effect.

The storage battery 2 illustrated in FIG. 3, when compared with the second dye-sensitized solar cell 1B illustrated in FIG. 2, differs in that the electrode 54 is used in place of the electricity generation-side complex 91, that the electricity generation layer 82 is not formed, and that the mesh-like electrode 55 is not disposed. The rest of the storage battery 2 is the same as the second dye-sensitized solar cell 1B illustrated in FIG. 2.

Accordingly, constituent elements, among those of the storage battery 2 illustrated in FIG. 3, which are the same as constituent elements of the second dye-sensitized solar cell 1B illustrated in FIG. 2 are denoted by the same reference numerals and characters and the description of the configuration and operation of these constituent elements will be omitted or simplified.

The electrode 54 is not limited in particular in material, structure and the like. The electrode 54 may be made from metal or carbon, or may be such that the transparent conductive film 52 is formed on a surface of the glass substrate 51a, as in the case of the electricity generation-side complex 91. A metal substrate may be used in place of the glass substrate 51b on which the transparent conductive film 52 is disposed. As the metal substrate, a titanium plate or a ruthenium plate is preferably used since it is resistant to corrosion by an electrolytic solution. In addition, use of the metal substrate eliminates the need to separately dispose a transparent conductive film. In this case, insulation is performed on a surface of the metal substrate on the side thereof not in contact with an electrolytic solution.

The solar cell 5 is not limited in particular in material, structure and the like. Examples of the material of the solar cell 5 include Si, CIGS (Cu(In, Ga)Se$_2$), TiO$_2$, and DSSC (dye-sensitized solar cell).

<Electricity Storage Layer>

The electricity storage layer 83 is the same in configuration as the electricity storage layer 83 of the second dye-sensitized solar cell 1B illustrated in FIG. 2. A method for manufacturing the electricity storage layer 83 is also the same as the method for manufacturing the electricity storage layer 83 of the second dye-sensitized solar cell 1B illustrated in FIG. 2.

Accordingly, the description of the configuration and operation of the electricity storage layer 83 will be omitted or simplified.

<Operation of Storage Battery>

The operation of the storage battery 2 will be described with reference to the accompanying drawings.

As illustrated in FIG. 3, some of electrons generated at the solar cell 5 flow through the lead wire 57 toward the Pt counter electrode 53, as shown by reference numeral 61. The rest of the electrons generated at the solar cell 5 flows from the lead wire 57 to the electrode 54.

The electrons flowing into the electrode 54 flow from the electrode 54 to the electricity storage layer 83 and are stored in the electrode material 20 for batteries constituting the electricity storage layer 83.

Hence, according to the storage battery 2, it is possible to supply electricity to external equipment even if the amount of solar insolation decreases drastically. Furthermore, it is possible to take measures, such as switchover to a general commercial power source, while supplying electricity to the external equipment by taking advantage of electricity storage functions.

(Advantageous Effects of Storage Battery)

The storage battery of the present invention is high in electricity storage efficiency since the electrode material for batteries contained in the electricity storage layer is high in electricity storage efficiency.

EXAMPLES

Examples of the present invention will be described hereinafter. However, the present invention should not be construed as being limited to these examples.

Practical Example 1

Manufacture of WO$_3$ Powder

<Plasma Treatment Step>

Tungsten trioxide (WO$_3$) powder having an average particle diameter of 3 μm was prepared as raw material powder. This raw material powder was sprayed into RF plasma using the atmosphere (air) as a carrier gas, so as to be 1 m/s in average flow velocity. Thus, a plasma treatment step was carried out in which an oxidation reaction was induced while sublimating the raw material powder. The temperature of plasma flame at the time of plasma treatment was set to 10000° C.

<Rapid Cooling Step>

After the plasma treatment, a rapid cooling step was carried out on WO$_3$ powder having flown out of plasma flame under the conditions shown in Table 1. That is, the rapid cooling step was carried out after setting a rapid cooling distance in a rapid cooling area to 2 m and a cooling rate in the rapid cooling area to 1000° C./s. Consequently, there was obtained the WO$_3$ powder.

TABLE 1

| Sample No. | Composition of Electrode Material for Battery | Plasma Treatment Process Plasma Flame Temperature (° C.) | Rapid Cooling Step Cooling Rate of WO$_3$ (° C./s) | Rapid Cooling Distance (m) | Heat Treatment Step Temperature (° C.) | Heat Treatment Step Time (H) | BET Specific Surface Area of Electrode Material for Battery (m$^2$/g) |
|---|---|---|---|---|---|---|---|
| Example 1 | WO$_3$ | 10000 | 1000 | 2 | — | — | 120 |
| Example 2 | WO$_3$ | 10000 | 1000 | 1.5 | 300 | 1 | 100 |
| Example 3 | WO$_3$ | 10000 | 1000 | 2 | 450 | 50 | 50 |
| Example 4 | WO$_3$ | 10000 | 1000 | 2 | 600 | 1 | 36 |
| Example 5 | WO$_3$ | 10000 | 1000 | 2 | 700 | 1 | 18 |

(Evaluation of WO$_3$ Powder)

The BET specific surface area of the WO$_3$ powder thus obtained was measured, and a Raman spectroscopic analysis was performed to detect peaks.

<Measuring Conditions in Raman Spectroscopic Analysis>

Measurements were made using a spectrograph PDP-320 made by Photon Design Corporation.

For measuring conditions, the measurement mode of the spectrograph was specified as "Microscopic Raman", the measurement magnification thereof as 100×, a beam diameter as 1 μm or smaller, a light source as an Ar$^+$ laser having a wavelength of 514.5 nm, laser power at the laser tube of the Ar$^+$ laser as 0.5 mW, a diffraction grating as Single 600 gr/mm, a cross slit as 100 μm, and a slit as 100 μm. A 1340-channel CCD made by Nippon Roper, K. K. was used as a detector.

The measuring range of the detector was set to 100 to 1500 cm$^{-1}$.

Table 1 shows the manufacturing conditions of the WO$_3$ powder and the results of measuring the BET specific surface area.

Table 2 shows the measurement results of Raman spectroscopic analysis.

Figure 4:
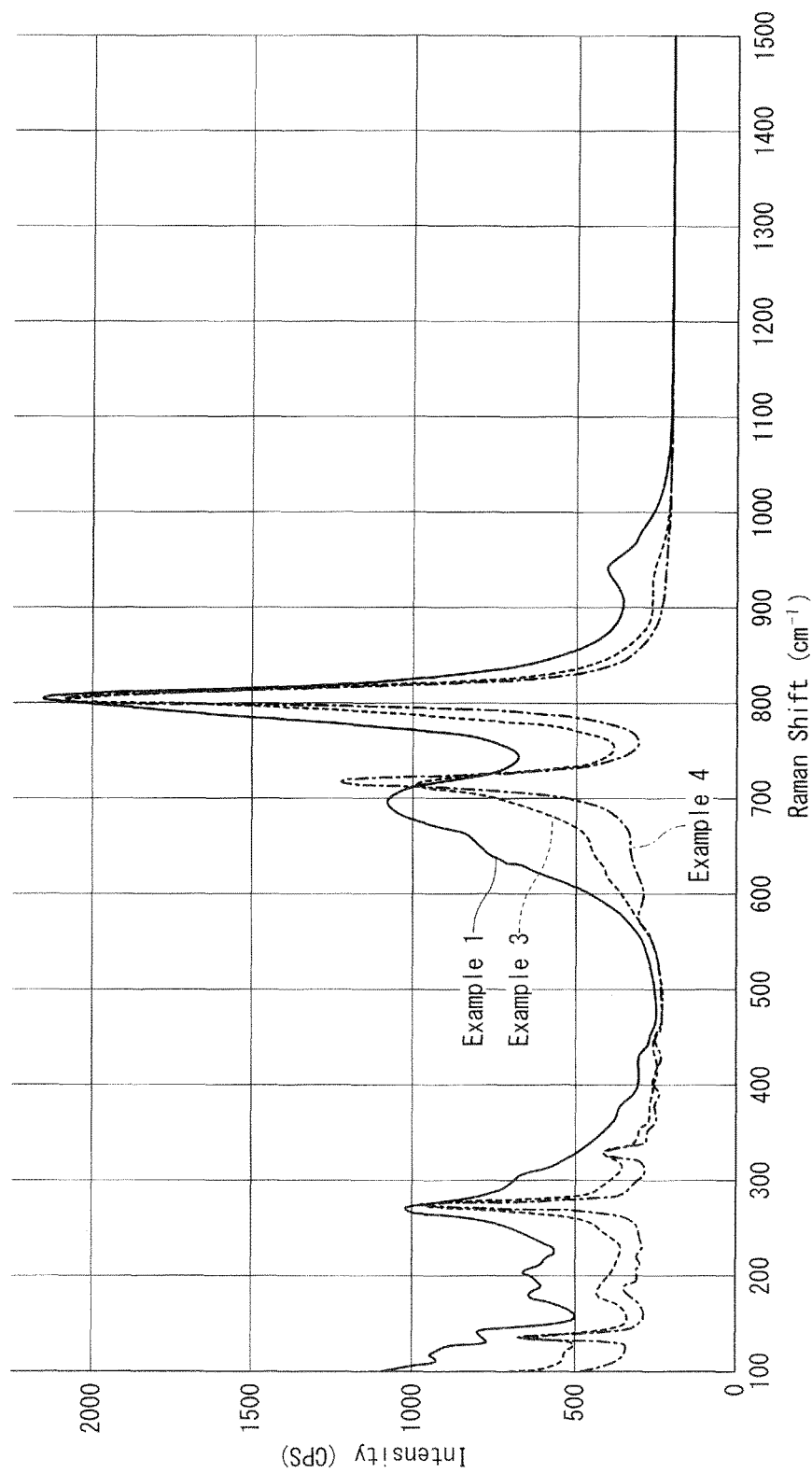
FIG. 4 illustrates measurement results based on Raman spectroscopic analysis.

FIG. 4 shows the measurement results of Raman spectroscopic analysis.

TABLE 2

| | First Peak | | Second Peak | | Third Peak | | Fourth Peak | | Fifth Peak | |
|---|---|---|---|---|---|---|---|---|---|---|
| sample No. | Peak Position (cm$^{-1}$) | Peak Intensity $I_1$ (cps) | Peak Position (cm$^{-1}$) | Peak Intensity $I_2$ (cps) | Peak Position (cm$^{-1}$) | Peak Intensity $I_3$ (cps) | Peak Position (cm$^{-1}$) | Peak Intensity $I_4$ (cps) | Peak Position (cm$^{-1}$) | Peak Intensity $I_5$ (cps) |
| Example 1 | 269 | 359 | 695 | 688 | 801 | 1890 | 132 | 132 | 935 | 128 |
| Example 2 | 270 | 1060 | 703 | 1596 | 803 | 4812 | 130 | 341 | 938 | 229 |
| Example 3 | 272 | 2023 | 712 | 2171 | 805 | 6242 | 136 | 788 | 935 | 76 |
| Example 4 | 273 | 4517 | 717 | 6335 | 807 | 12771 | 135 | 2392 | 935 | 14 |
| Example 5 | 274 | 25253 | 718 | 15778 | 808 | 56052 | 135 | 11534 | None | — |

(Preparation of Electrode Material Paste for Batteries)

First, 59 parts by mass of terpineol serving as a solvent and 4 parts by mass of ethyl cellulose serving as a binder were agitated and mixed. Next, 28 parts by mass of the WO$_3$ powder was added while agitating the solvent in which the binder was dissolved, and the solvent was continued to be agitated. Consequently, there was obtained electrode material paste for batteries.

The viscosity at 25° C. of the electrode material paste for batteries thus obtained was measured.

Table 3 shows the blending ratio of the WO$_3$ powder, the solvent and the binder in the electrode material paste for batteries and the viscosity at 25° C. of the electrode material paste for batteries.

TABLE 3

| | Blending of Paste | | | | |
|---|---|---|---|---|---|
| | WO$_3$ Powder | Binder | | Solvent Blending | Viscosity |
| Sample No. | Blending Ratio (mass parts) | Material | Blending Ratio (mass parts) | Ratio (mass parts) | of Paste (cps) |
| Example 1 | 28 | Ethyl Cellurose | 4 | 59 | 6300 |
| Example 2 | 32 | Ethyl Cellurose | 5 | 59 | 5400 |
| Example 3 | 36 | Ethyl Cellurose | 5 | 59 | 4800 |
| Example 4 | 36 | Ethyl Cellurose | 5 | 58 | 4100 |
| Example 5 | 42 | Ethyl Cellurose | 7 | 57 | 1800 |

(Fabrication of First Dye-Sensitized Solar Cell)

The first dye-sensitized solar cell 1A illustrated in FIG. 1 was fabricated.

First, using an electricity generation-side complex 91 in which a transparent conductive film 52 was formed on one side of a glass substrate 51a having a thickness of 1.1 mm and a sheet resistance of 5Ω/□, the electrode material paste for batteries was printed and coated on a surface of the transparent conductive film 52 by a screen printing method. The temperature of the glass substrate 51a coated with this paste was raised from 25° C. to 450° C. in the atmosphere at a temperature rise rate of 10° C./min using an electric furnace, and then the glass substrate 51a was calcinated at 450° C. for 30 minutes. After calcination, there was formed an electrode layer composed of a porous body formed on the surface of the transparent conductive film 52 as the result of WO$_3$ particles 20 being necking-bonded to one another. The porous body was 65% in voidage and 15 μm in thickness.

Next, the electrode layer thus fabricated was immersed in 40 mMol/L of an yttrium nitrate solution at 70° C. for one hour, cleaned with ethanol, and then dried. Thereafter, the temperature of the electrode layer was raised from 25° C. to 450° C. at a temperature rise rate of 10° C./min, and then the electrode layer was calcinated at 450° C. for 30 minutes. After calcination, the surfaces of the WO$_3$ particles 20 were coated with a Y$_2$O$_3$ film. This Y$_2$O$_3$ film was formed in order to facilitate the fixation of a dye 30 onto the surfaces of the WO$_3$ particles 20.

In addition, the electrode layer formed on the surface of the transparent conductive film 52 was immersed in a dye solution at room temperature for 48 hours to fabricate an electricity generation and storage layer 81. As the dye solution, there was used a solution prepared by dissolving N719 (di-tetrabutylammonium-cis-bis(isothiocyanate)bis(2,2'-bipyridyl-4,4'-dicarboxylate) ruthenium (II)) made by Sigma-Aldrich Co. LLC. in a mixed solvent of one part by volume of acetonitrile and one part by volume of t-butyl alcohol, so as to be 0.3 mMol/L in molarity. In the electricity generation and storage layer 81, the dye 30 was fixated on the surfaces of the WO$_3$ particles 20 through the Y$_2$O$_3$ film.

Furthermore, there was fabricated a non-electricity generation-side complex 92 in which a transparent conductive film 52 and a Pt counter electrode 53 were formed in this order on a surface of another glass substrate 51b. The Pt counter electrode 53 was prepared such that a platinum layer having a thickness of 80 nm was formed on a surface of the transparent conductive film 52 by sputtering.

Next, a tubular spacer resin 56 the thickness of which in a thickness direction of the electricity generation and storage layer 81 was 60 μm and in which electrolytic composition inlets were arranged in four places was disposed so as to surround the periphery of the electricity generation and storage layer 81. Thereafter, the electricity generation-side complex 91 and the non-electricity generation-side complex 92 heated to 110° C. were bonded to each other.

An electrolytic composition (electrolytic solution) 70 was injected from an electrolytic composition inlet by means of a syringe, and the inlet was sealed up with two-pack curable resin. As the electrolytic solution, a solution was used in which 0.5 mol/L of lithium iodide, 0.05 mol/L of iodine, 0.58 mol/L of t-butylpyridine, and 0.6 mol/L of EtMeIm (CN)$_2$(1-ethyl-3-methylimidazolium dicyanamide) were dissolved in an acetonitrile solvent as the constituents of the electrolytic solution.

Consequently, there was obtained the first dye-sensitized solar cell 1A.

(Evaluation of First Dye-Sensitized Solar Cell)

Using a solar simulator, light having a spectrum of AM1.5 and an intensity of 1 kW/m² was radiated to the first dye-sensitized solar cell 1A thus obtained to measure photoelectric conversion efficiency. This photoelectric conversion efficiency was defined as power generation efficiency.

Next, the first dye-sensitized solar cell 1A was connected to a 510Ω resistor to measure current changes when light was irradiated and when light was cut off. As a light source, there was used a light source having a spectrum of AM1.5 and an intensity of 1 kW/m² available from the solar simulator.

In addition, tests were conducted to confirm the electricity storage effect of the first dye-sensitized solar cell 1A. That is, the first dye-sensitized solar cell 1A was left at rest for 20 seconds in a dark place to confirm that the amount of electrical generation was zero. Thereafter, light was radiated to the solar cell for 20 seconds, and was then cut off. Then, an evaluation was made of discharge capacity as represented by the duration from when the current value of the first dye-sensitized solar cell 1A was maximum at the time of light irradiation to when the current value decreased to 0 mA/cm² after light interruption. This discharge capacity was defined as electricity storage capacity.

Table 4 shows the power generation efficiency and electricity storage capacity of the first dye-sensitized solar cell 1A.

obtained after the rapid cooling step. When a heat treatment step was carried out, there was obtained $WO_3$ powder.

(Evaluation of $WO_3$ Powder)

The BET specific surface area of the $WO_3$ powder thus obtained was measured in the same way as in Practical Example 1, and a Raman spectroscopic analysis was performed to detect peaks.

FIG. 4 illustrates the measurement results of Raman spectroscopic analyses in Practical Examples 3 and 4.

(Preparation of Electrode Material Paste for Batteries)

Electrode material paste for batteries was prepared in the same way as in Practical Example 1, except that the conditions for preparing the electrode material paste for batteries were changed as shown in Table 3.

The viscosity at 25° C. of the electrode material paste for batteries thus obtained was measured in the same way as in Practical Example 1.

(Fabrication of First Dye-Sensitized Solar Cell)

First dye-sensitized solar cells 1A were fabricated and evaluated in the same way as in Practical Example 1, except that electrode material paste for batteries having the composition shown in Table 3 was used in place of the electrode material paste for batteries of Practical Example 1.

Table 4 shows the power generation efficiency and electricity storage capacity of the first dye-sensitized solar cells 1A.

Comparative Example 1

A dye-sensitized solar cell was fabricated in the same way as in Practical Example 1, except that titanium oxide paste

TABLE 4

| Sample No. | Electrode Material Paste for Battery Type | First Dye-Sensitized Solar Cell | | Second Dye-Sensitized Solar Cell | | Storage Battery |
|---|---|---|---|---|---|---|
| | | Power Generation Efficiency (%) | Electricity Storage Capacity (C/m²) | Power Generation Efficiency (%) | Electricity Storage Capacity (C/m²) | Electricity Storage Capacity (C/m²) |
| Example 1 | Example 1 | 1.1 | 156 | — | — | — |
| Example 2 | Example 2 | 1.2 | 160 | — | — | — |
| Example 3 | Example 3 | 2.0 | 245 | — | — | — |
| Example 4 | Example 4 | 1.6 | 200 | — | — | — |
| Example 5 | Example 5 | 1.4 | 160 | — | — | — |
| Comparative Example 1 | Comparative Example 1 | 5.0 | 0 | — | — | — |
| Example 6 | Example 1 | — | — | 3.2 | 148 | — |
| Example 7 | Example 2 | — | — | 3.3 | 170 | — |
| Example 8 | Example 3 | — | — | 4.1 | 260 | — |
| Example 9 | Example 4 | — | — | 3.8 | 204 | — |
| Example 10 | Example 5 | — | — | 3.2 | 156 | — |
| Example 11 | Example 1 | — | — | — | — | 1000 |
| Example 12 | Example 2 | — | — | — | — | 1100 |
| Example 13 | Example 3 | — | — | — | — | 1200 |
| Example 14 | Example 4 | — | — | — | — | 1200 |
| Example 15 | Example 5 | — | — | — | — | 1100 |
| Comparative Example 2 | Comparative Example 1 | — | — | — | — | 0 |

Practical Examples 2 to 5

Manufacture of $WO_3$ Powder

A plasma treatment step and a rapid cooling step were carried out in the same way as in Practical Example 1, except that the conditions of the rapid cooling step were changed as shown in Table 1.

<Heat Treatment Step>

In the atmosphere, a heat treatment based on the conditions shown in Table 1 was performed on $WO_3$ powder containing titanium oxide ($TiO_2$) having an average particle diameter of 13 μm was used in place of the electrode material paste for batteries of Practical Example 1.

The dye-sensitized solar cell thus obtained was configured such that the $WO_3$ particles 20 constituting the electricity generation and storage layer 81 were replaced with $TiO_2$ particles in the first dye-sensitized solar cell 1A illustrated in FIG. 1.

Thus obtained dye-sensitized solar cell was evaluated in the same way as in Practical Example 1.

Table 4 shows the power generation efficiency and electricity storage capacity of the dye-sensitized solar cell.

Practical Example 6

Fabrication of Second Dye-Sensitized Solar Cell

The second dye-sensitized solar cell 1B illustrated in FIG. 2 was fabricated.

First, using an electricity generation-side complex 91 in which a transparent conductive film 52 was formed on one side of a glass substrate 51a having a thickness of 1.1 mm and a sheet resistance of 5Ω/□, titanium oxide paste containing titanium oxide ($TiO_2$) 10 having an average particle diameter of 13 μm was printed and coated on a surface of the transparent conductive film 52 by a screen printing method. The glass substrate 51a coated with this paste was calcinated in the atmosphere at 450° C. for 30 minutes using an electric furnace. After calcination, there was formed an electrode layer composed of a porous body formed on the surface of the transparent conductive film 52 as the result of the particles of the $TiO_2$ 10 being necking-bonded to one another. The porous body was 50% in voidage and 10 μm in thickness.

Next, the electrode material paste for batteries of Practical Example 1 was printed and coated by a screen printing method on a surface of the electrode layer composed of a porous body formed as the result of the particles of the $TiO_2$ 10 being necking-bonded to one another. The temperature of the glass substrate 51a coated with this paste was raised from 25° C. to 450° C. in the atmosphere at a temperature rise rate of 10° C./min using an electric furnace, and then the glass substrate 51a was calcinated at 450° C. for 30 minutes. After completion of calcination, there was formed an electrode layer composed of a porous body formed on the surface of the transparent conductive film 52 as the result of $WO_3$ particles 20 being necking-bonded to one another. The porous body was 65% in voidage and 10 μm in thickness.

In addition, as an extraction electrode for external connection, a Ti mesh electrode 55 was formed on a surface of the electrode layer composed of the porous body formed as the result of the $WO_3$ particles 20 being necking-bonded to one another. In order to prevent the transparent conductive film 52 and the Ti mesh electrode 55 from coming into contact with each other, the lead-out portion of the extraction electrode was insulation-treated.

Next, the two-layered electrode layer thus fabricated was immersed in a dye solution at room temperature for 24 hours to fabricate an electricity generation layer 82 and an electricity storage layer 83. As the dye solution, there was used a solution prepared by dissolving N719 (di-tetrabutylammonium-cis-bis(isothiocyanate)bis(2,2'-bipyridyl-4,4'-dicarboxylate) ruthenium (II)) made by Sigma-Aldrich Co. LLC. in a mixed solvent of one part by volume of acetonitrile and one part by volume of t-butyl alcohol, so as to be 0.3 mMol/L in molarity. In the electricity generation and storage layer 81, the dye 30 was fixated on the surfaces of the $WO_3$ particles 20 through the $Y_2O_3$ film.

Furthermore, there was fabricated a non-electricity generation-side complex 92 in which a transparent conductive film 52 and a Pt counter electrode 53 were formed in this order on a surface of another glass substrate 51b. The Pt counter electrode 53 was prepared such that a platinum layer having a thickness of 80 nm was formed on a surface of the transparent conductive film 52 by sputtering.

Next, a tubular spacer resin 56 the thickness of which in a thickness direction of the electricity generation and storage layer 81 was 60 μm and in which electrolytic composition inlets were arranged in four places was disposed so as to surround the periphery of the electricity generation and storage layer 81. Thereafter, the electricity generation side complex 91 and the non-electricity generation-side complex 92 heated to 110° C. were bonded to each other.

An electrolytic composition (electrolytic solution) 70 was injected from an electrolytic composition inlet with a syringe, and the inlet was sealed up with UV-curable resin. As the electrolytic solution, there was used a solution in which 0.5 mol/L of lithium iodide, 0.05 mol/L of iodine, 0.58 mol/L of t-butylpyridine, and 0.6 mol/L of EtMeIm $(CN)_2$(1-ethyl-3-methylimidazolium dicyanamide) were dissolved in an acetonitrile solvent as the constituents of the electrolytic solution.

Consequently, there was obtained the second dye-sensitized solar cell 1B.

(Evaluation of Second Dye-Sensitized Solar Cell)

The second dye-sensitized solar cell 1B was evaluated in the same way as the first dye-sensitized solar cell 1A of Practical Example 1.

Table 4 shows the power generation efficiency and electricity storage capacity of the second dye-sensitized solar cell 1B.

Practical Examples 7 to 10

Second dye-sensitized solar cells 1B were fabricated and evaluated in the same way as in Practical Example 6, except that the electrode material paste for batteries of Practical Examples 2 to 5 was used in place of the electrode material paste for batteries of Practical Example 1.

Table 4 shows the power generation efficiency and electricity storage capacity of the second dye-sensitized solar cells 1B.

Practical Example 11

Fabrication of Storage Battery

The storage battery 2 illustrated in FIG. 3 was fabricated.

First, using an electricity generation-side complex 91 in which a transparent conductive film 52 was formed on one side of a glass substrate 51a having a thickness of 1.1 mm and a sheet resistance of 5Ω/□, the electrode material paste for batteries of Practical Example 1 was printed and coated on a surface of the transparent conductive film 52 by a screen printing method. The temperature of the glass substrate 51a coated with this paste was raised from 25° C. to 450° C. in the atmosphere at a temperature rise rate of 10° C./min using an electric furnace, and then the glass substrate 51a was calcinated at 450° C. for 30 minutes. After calcination, there was formed an electricity storage layer 83 composed of a porous body formed on the surface of the transparent conductive film 52 as the result of $WO_3$ particles 20 being necking-bonded to one another. The porous body was 65% in voidage and 15 μm in thickness.

Next, a tubular spacer resin 56 the thickness of which in a thickness direction of the electricity storage layer 83 was 15 and in which electrolytic composition inlets were arranged in four places was disposed so as to surround the periphery of the electricity storage layer 83. Thereafter, the electrode 54 and the non-electricity generation-side complex 92 heated to 110° C. were bonded to each other. The thickness of the spacer resin 56 was set to 60

An electrolytic composition (electrolytic solution) 70 was injected from an electrolytic composition inlet with a syringe, and the inlet was sealed up with UV-curable resin.

As the electrolytic solution, there was used a solution in which 0.5 mol/L of lithium iodide, 0.05 mol/L of iodine, 0.58 mol/L of t-butylpyridine, and 0.6 mol/L of EtMeIm $(CN)_2$(1-ethyl-3-methylimidazolium dicyanamide) were dissolved in an acetonitrile solvent as the constituents of the electrolytic solution.

Consequently, there was obtained the storage battery 2.
(Evaluation of Storage Battery)

The electricity storage performance of the storage battery 2 thus obtained was measured. The storage battery 2 was charged at 0.74 V for 640 seconds using an external power source. Thereafter, electricity storage capacity was calculated from the value of a current flowing through a 510Ω resistor connected to the storage battery 2.

Table 4 shows the electricity storage capacity of the storage battery 2.

Practical Examples 12 to 15

Storage batteries 2 were fabricated and evaluated in the same way as in Practical Example 11, except that the electrode material paste for batteries of Practical Examples 2 to 5 was used in place of the electrode material paste for batteries of Practical Example 1.

Table 4 shows the electricity storage capacity of the storage batteries 2.

Comparative Example 2

A storage battery was fabricated in the same way as in Practical Example 11, except that the titanium oxide paste of Comparative Example 1 was used in place of the electrode material paste for batteries of Practical Example 1.

The storage battery thus obtained was configured such that the $WO_3$ particles 20 constituting the electricity storage layer 83 were replaced with $TiO_2$ particles in the storage battery 2 illustrated in FIG. 3.

The obtained storage battery was evaluated in the same way as in Practical Example 11.

Table 4 shows the electricity storage capacity of the storage battery.

As is clear from the results obtained from the above-described practical and comparative examples, the dye-sensitized solar cells and the storage batteries which use the electrode material for batteries of the present invention have proved to be high in electricity storage efficiency.

Practical Examples 16 to 18

Manufacture of $WO_3$ Powder

Tungsten trioxide ($WO_3$) powder having an average particle diameter of 1 μm was prepared as raw material powder. This raw material powder was sprayed into RF plasma using the atmosphere (air) as a carrier gas, so as to be 1 m/s in average flow velocity. Thus, a plasma treatment step was carried out in which an oxidation reaction was induced while sublimating the raw material powder. The temperature of plasma flame at the time of plasma treatment was set to 11000° C.

<Rapid Cooling Step>

After completion of the plasma treatment, a rapid cooling step was carried out on $WO_3$ powder having flown out of plasma flame under the conditions shown in Table 5. That is, the rapid cooling step was carried out after setting a rapid cooling distance in a rapid cooling area to no shorter than 1 m and a cooling rate in the rapid cooling area to no lower than 1200° C./s. Consequently, there was obtained the $WO_3$ powder.

TABLE 5

| Sample No. | Plasma Treatment Composition of Electrode Material | Plasma Treatment Process Plasma Flame Temperature (° C.) | Rapid Cooling Process Cooling Rate of $WO_3$ (° C./s) | Rapid Cooling Distance (m) | Heat Treating Process Temperature (° C.) | Heat Treating Process Time (H) | Electrode Material ($WO_3$) BET Specific Surface Area ($m^2$/g) | Electrode Material ($WO_3$) Average Particle Diameter (nm) |
|---|---|---|---|---|---|---|---|---|
| Examples 16-18 | $WO_3$ | 11000 | 1200 or more | 1 or more | 700 | 1 | 19 | 45 |

<Heat Treatment Step>

Next, a 700° C. heat treatment was performed on thus obtained tungsten oxide powder for one hour. Consequently, there was obtained tungsten oxide ($WO_3$) powder having an average particle diameter of 45 nm as a diameter converted from a BET specific surface area (19 $m^2$/g on average).
(Evaluation of $WO_3$ Powder)

A Raman spectroscopic analysis was performed on the $WO_3$ powder thus obtained in the same way as in Practical Example 1. Table 6 shows the results of the analysis.

TABLE 6

| Sample No. | First Peak Peak Position ($cm^{-1}$) | First Peak Peak Intensity $I_1$ (cps) | Second Peak Peak Position ($cm^{-1}$) | Second Peak Peak Intensity $I_2$ (cps) | Third Peak Peak Position ($cm^{-1}$) | Third Peak Peak Intensity $I_3$ (cps) | Fourth Peak Peak Position ($cm^{-1}$) | Fourth Peak Peak Intensity $I_4$ (cps) | Fifth Peak Peak Position ($cm^{-1}$) | Fifth Peak Peak Intensity $I_5$ (cps) |
|---|---|---|---|---|---|---|---|---|---|---|
| Examples 16-18 | 274 | 5620 | 717 | 9126 | 807 | 16382 | 135 | 3246 | 934 | 4 |

(Preparation of Electrode Material Paste for Batteries)

Next, a metal oxide coating film made from yttrium oxide was disposed on thus obtained tungsten oxide ($WO_3$) powder (sample). In addition, 95 parts by mass of the tungsten oxide ($WO_3$) powder on which the metal oxide coating film was disposed, 5 parts by mass of magnesium oxide (MgO) powder (68 nm in average particle diameter) were mixed to prepare a mixed sample.

Then, 37 parts by mass of the mixed sample, 5 parts by mass of ethyl cellulose, and 58 parts by mass of a terpineol solvent were mixed thereby to prepare electrode material paste for batteries (paste sample) having a viscosity at 25° C. of 5010 cps.

(Fabrication of Storage Batteries)

The storage battery 2 illustrated in FIG. 3 was fabricated. Three types of storage batteries 2 were fabricated as Practical Examples 16 to 18 by varying the thickness of the spacer resin 56 and the composition of the electrolytic solution.

First, there was prepared an electricity generation-side complex 91 in which a transparent conductive film 52 was formed on one side of the same glass substrate 51a (1.1 mm in thickness and 5Ω/□ in sheet resistance) as used in Practical Example 11.

The paste sample (electrode material paste for batteries) was printed and coated on a surface of the transparent conductive film 52 by a screen printing method. The temperature of the glass substrate 51a coated with this paste was raised from 25° C. to 450° C. in the atmosphere at a temperature rise rate of 15° C./min using an electric furnace, and then the glass substrate 51a was calcinated at 500° C. for 40 minutes. After completion of the calcination, there was formed an electricity storage layer 83 composed of a porous body formed on the surface of the transparent conductive film 52 as the result of the particles of the mixed sample being necking-bonded to one another. The porous body was 55% in voidage and 50 µm in thickness.

Next, a tubular spacer resin 56 the thickness of which in a thickness direction of the electricity storage layer 83 was 50 µm and in which electrolytic composition inlets were arranged in two places was disposed so as to surround the periphery of the electricity storage layer 83. Thereafter, the electrode 54 and the non-electricity generation-side complex 92 (the same complex as the one discussed in Practical Example 11) heated to 110° C. were bonded to each other. The thicknesses of the spacer resin 56 are as shown in Table 7.

An electrolytic composition (electrolytic solution) 70 was injected from an electrolytic composition inlet with a syringe, and the inlet was sealed up with UV-curable resin. Table 7 also shows the composition of the electrolytic solution. TBP in Table 7 refers to tertiary butylpyridine.

TABLE 7

| | Spacer Resin Thickness (µm) | Electrolytic Solution | | | Electricity Storage Capacity (C/m²) |
|---|---|---|---|---|---|
| | | Organic Solvent Material | Electrolytic Composition | | |
| Sample No. | | | Material | Concentration (mol/L) | |
| Example 16 | 200 | Propyrene Carbonate | Lithium Iodide<br>Iodine<br>TBP | 1.5<br>0.1<br>1.0 | 8200 |
| Example 17 | 200 | γ-Butyrolactone | Lithium Iodide<br>Iodine<br>TBP | 2.0<br>0.05<br>1.0 | 10720 |
| Example 18 | 300 | γ-Butyrolactone | Lithium Iodide<br>Iodine<br>TBP | 2.0<br>0.05<br>1.0 | 13510 |

As the result of the above-described work, there were obtained the storage batteries according to Practical Examples 16 to 18.

(Evaluation of Storage Batteries)

The electricity storage capacities of the respective storage batteries thus obtained were measured in the same way as in Practical Example 11. Table 7 shows the results of the measurement.

As is evident from the results shown in the table, it has proven that electricity storage capacity is increased further by improving the necking bondability of electrode materials for batteries.

While several embodiments of the present invention have been described, these embodiments are shown by way of example only and are not intended to limit the scope of the invention. These novel embodiments may be carried out in other various ways, and various omissions, substitutions and modifications may be made therein without departing from the gist of the invention. It should therefore be noted that these embodiments and the modifications thereof fall within the scope or gist of the present invention, as well as in the scope of the present invention as defined by the appended claims and equivalents thereof.

REFERENCE SIGNS LIST

1: Dye-sensitized solar cell
1A: First dye-sensitized solar cell
1B: Second dye-sensitized solar cell
2: Storage battery
5: Solar cell
7: Solar cell-storage battery composite device
10: $TiO_2$ (photoelectric conversion material)
20: $WO_3$ (electrode material for batteries)
30: Dye
51, 51a, 51b: Glass substrate
52: Transparent conductive film
53: Pt counter electrode
54: Electrode
55: Mesh-like electrode
56: Spacer
57: Lead wire
59: Space
61, 62, 63, 64: Direction of electron flow
70: Electrolytic solution (electrolytic composition)

75: Light
81: Electricity generation and storage layer
82: Electricity generation layer (power generation layer)
83: Electricity storage layer
91: Electricity generation-side complex
92: Non-electricity generation-side complex

The invention claimed is:

1. An electrode material for batteries made from tungsten oxide powder, wherein the tungsten oxide powder has a first peak present within a wavenumber range of 268 to 274 cm$^{-1}$, a second peak present within a wavenumber range of 630 to 720 cm$^{-1}$, a third peak present within a wavenumber range of 800 to 810 cm$^{-1}$, a fourth peak present within a wavenumber range of 130 to 140 cm$^{-1}$, and a fifth peak present within a wavenumber range of 930 to 940 cm$^{-1}$, when a Raman spectroscopic analysis method is performed on the electrode material, and
wherein a BET specific surface area of the electrode material is 15 m$^2$/g or larger.

2. The electrode material for batteries according to claim 1, wherein a half-value width of the first peak is 8 to 25 cm$^{-1}$.

3. The electrode material for batteries according to claim 1, wherein a half-value width of the second peak is 15 to 75 cm$^{-1}$.

4. The electrode material for batteries according to claim 1, wherein a half-value width of the third peak is 15 to 50 cm$^{-1}$.

5. The electrode material for batteries according to claim 1, wherein the fourth peak is 0.10 or higher in intensity ratio ($I_4/I_3$) which is a ratio of an intensity $I_4$ of the fourth peak to an intensity $I_3$ of the third peak.

6. The electrode material for batteries according to claim 1, wherein the fifth peak is 0.04 or higher in intensity ratio ($I_5/I_3$) which is a ratio of an intensity $I_5$ of the fifth peak to an intensity $I_3$ of the third peak.

7. The electrode material for batteries according to claim 1, wherein the electrode material is used in a dye-sensitized solar cell or a storage battery.

8. An electrode material paste for batteries, including an electrode material for batteries according to claim 1.

9. The electrode material paste for batteries according to claim 8, including a binder whose pyrolysis rate at 500° C. is 99.0% or higher.

10. The electrode material paste for batteries according to claim 8, wherein the electrode material paste has a viscosity of 800 to 10000 cps.

11. A method for manufacturing an electrode material for batteries according to claim 1, the method comprising:
a step of preparing metallic tungsten powder or tungsten compound powder; and
a plasma treatment step of plasma-treating the metallic tungsten powder or the tungsten compound powder in an oxygen-containing ambient atmosphere.

12. The method for manufacturing an electrode material for batteries according to claim 11, the method further comprising a heat treatment step of performing a heat treatment at 300 to 1000° C. in an oxygen-containing ambient atmosphere, following the plasma treatment step.

13. The method for manufacturing an electrode material for batteries according to claim 12, wherein the heat treatment step is a step in which one type of treatment selected from among heat treatment in atmosphere, heat treatment in a pressurized ambient atmosphere, heat treatment in water, and microwave heat treatment, is performed.

14. A dye-sensitized solar cell using an electrode material for batteries according to claim 1.

15. A storage battery using an electrode material for batteries according to claim 1.

* * * * *